Figure 19:
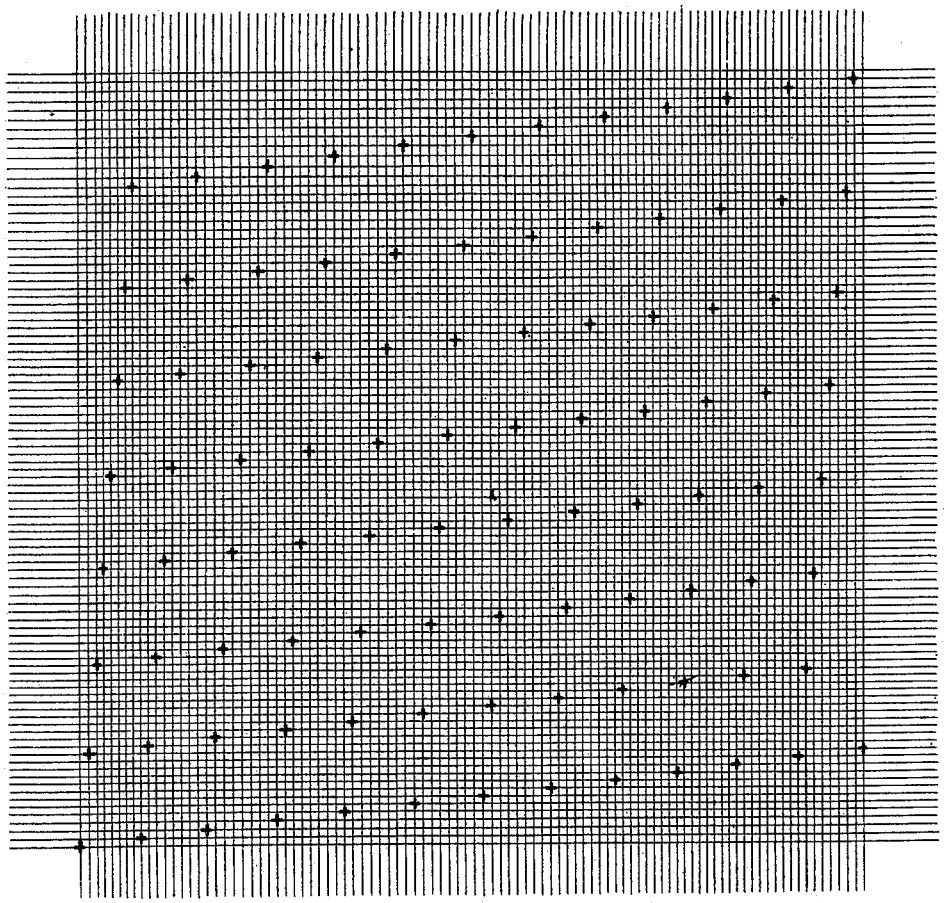

No. 705,539. Patented July 22, 1902.
A. MATITSCH.
LACE MAKING MACHINE.
(Application filed Oct. 31, 1901.)
(No Model.) 15 Sheets—Sheet 1.
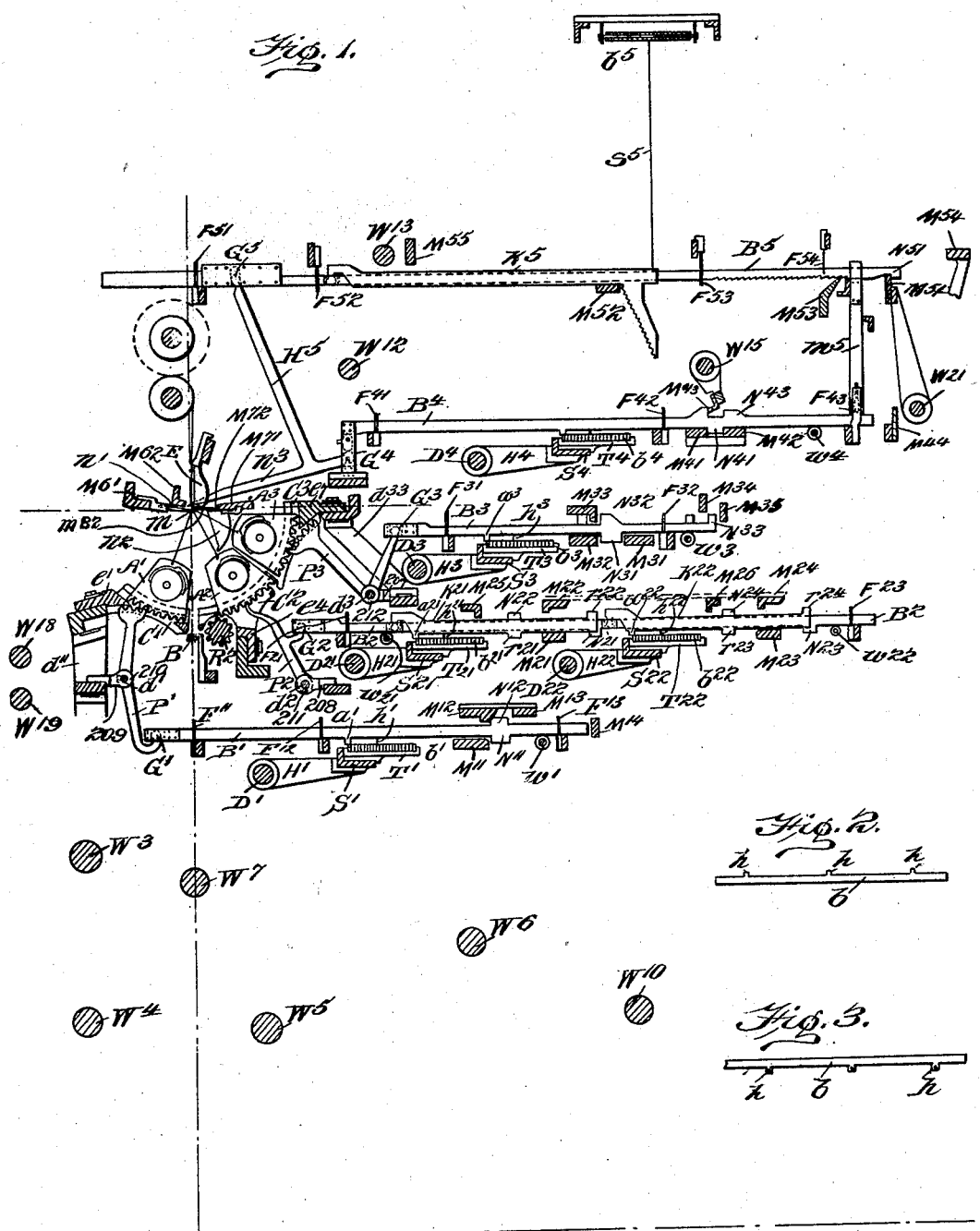
Witnesses:
H. G. Dieterich
C. K. Sommers
Inventor
August Matitsch
By
Atty's No. 705,539. Patented July 22, 1902.
A. MATITSCH.
LACE MAKING MACHINE.
(Application filed Oct. 31, 1901.)
(No Model.) 15 Sheets—Sheet 2.
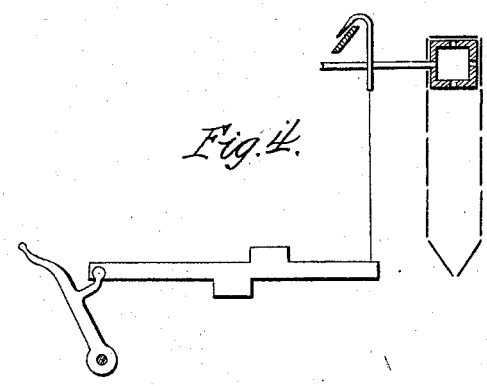
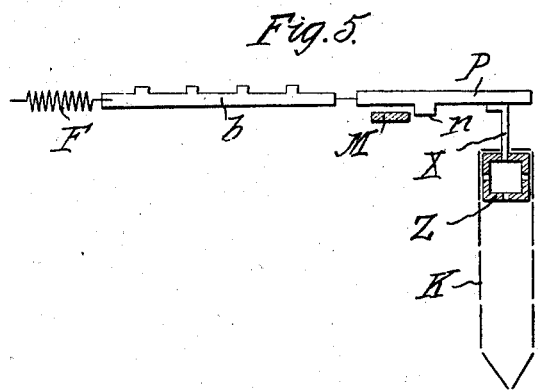
Witnesses:
Inventor:
August Matitsch.
Attys.

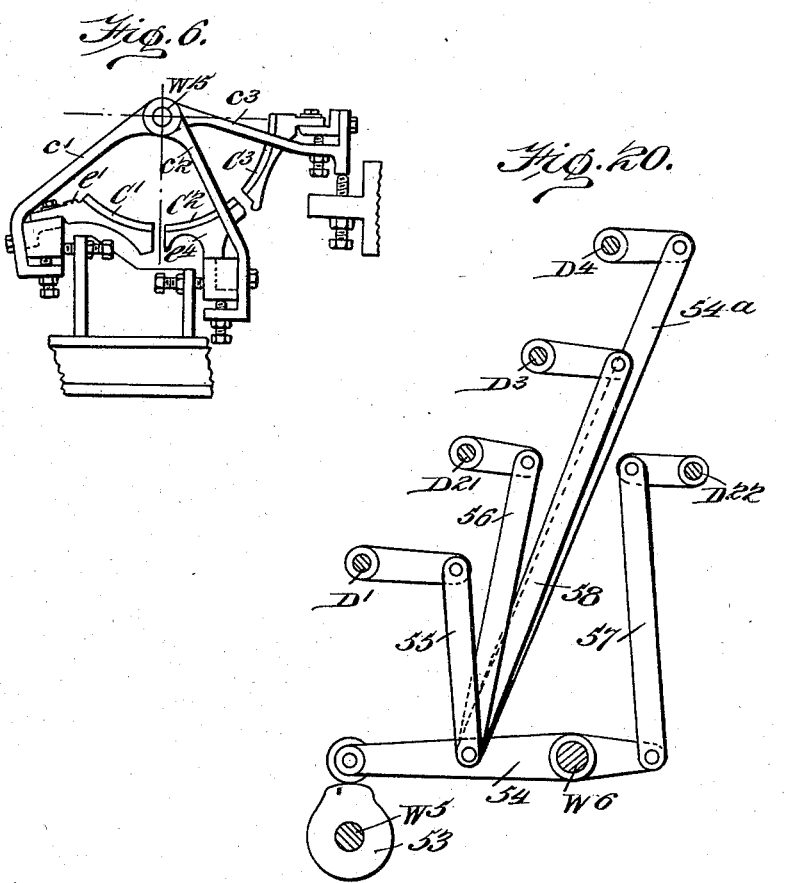

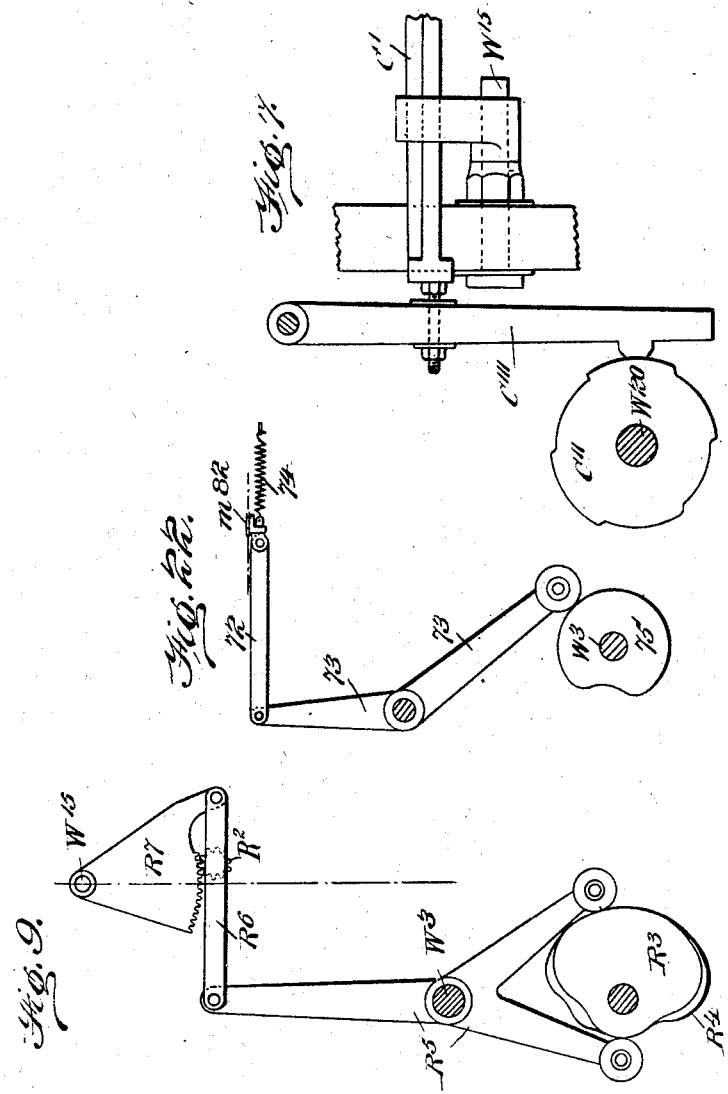

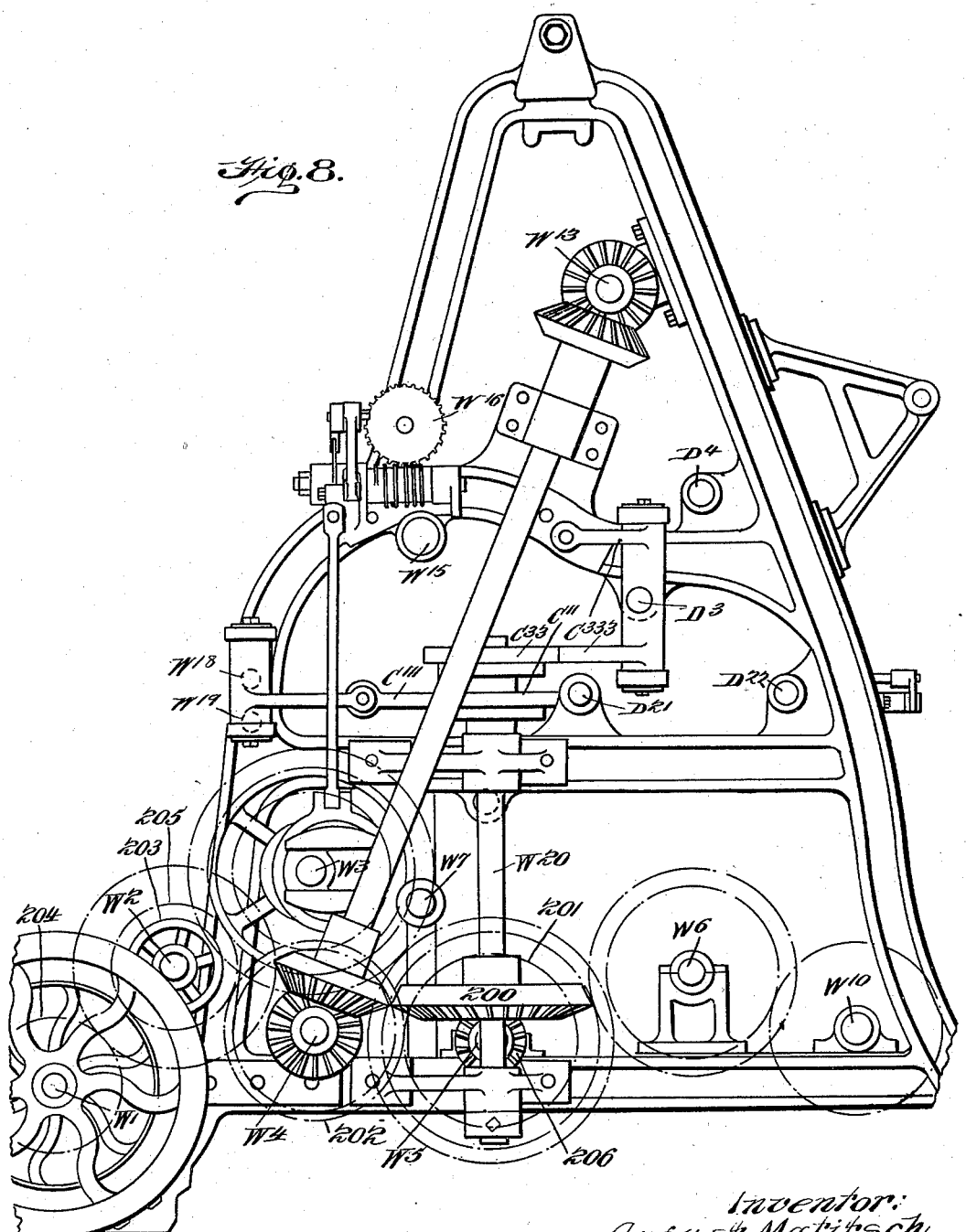

No. 705,539. Patented July 22, 1902.
A. MATITSCH.
LACE MAKING MACHINE.
(Application filed Oct. 31, 1901.)
(No Model.) 15 Sheets—Sheet 6.
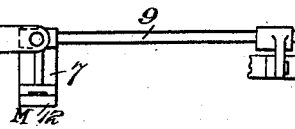
Fig. 10.
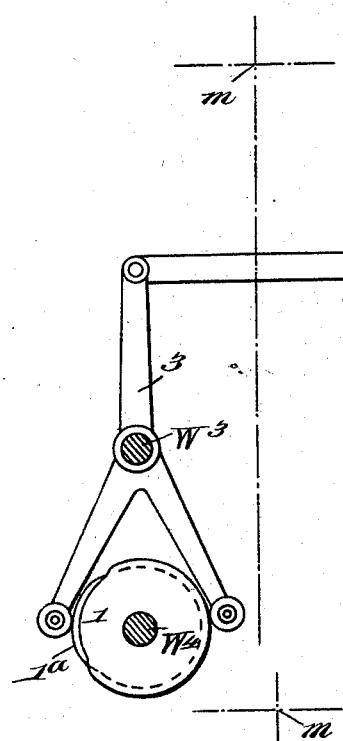
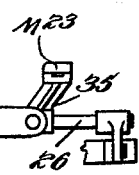
Fig. 17.
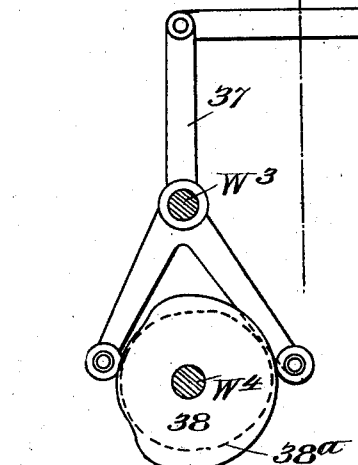
Witnesses:
H. G. Dieterich
O. H. Sommer
Inventor
August Matitsch
By
Nunnenkofen
Att'y's

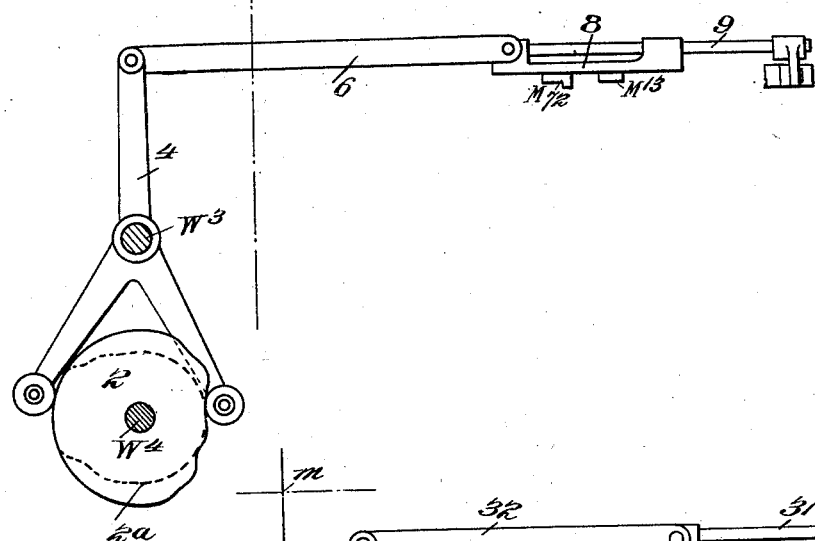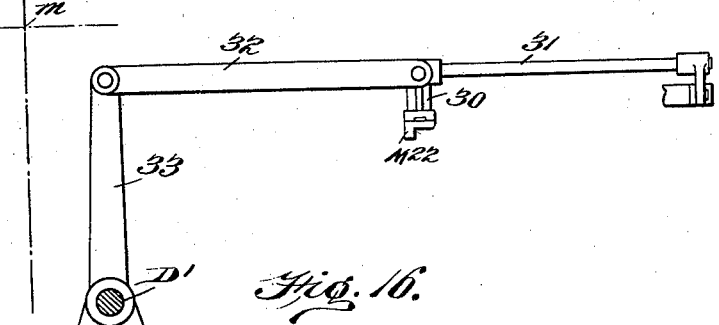

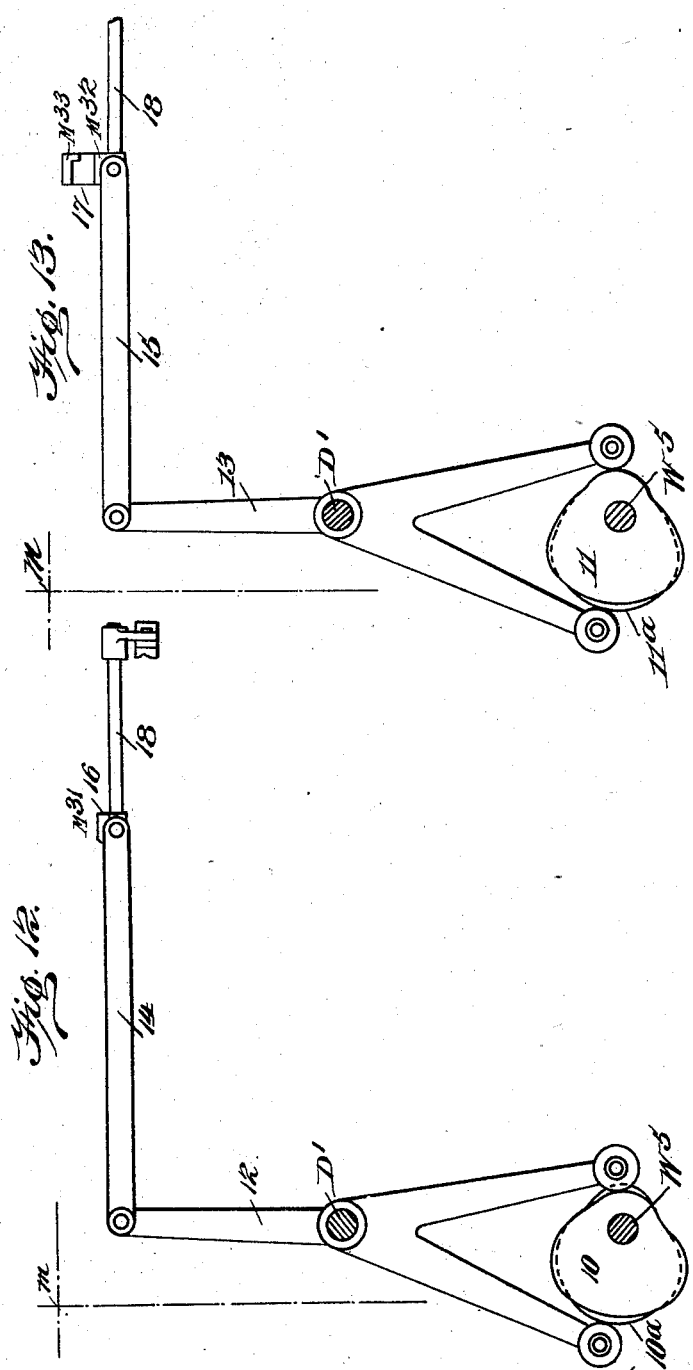

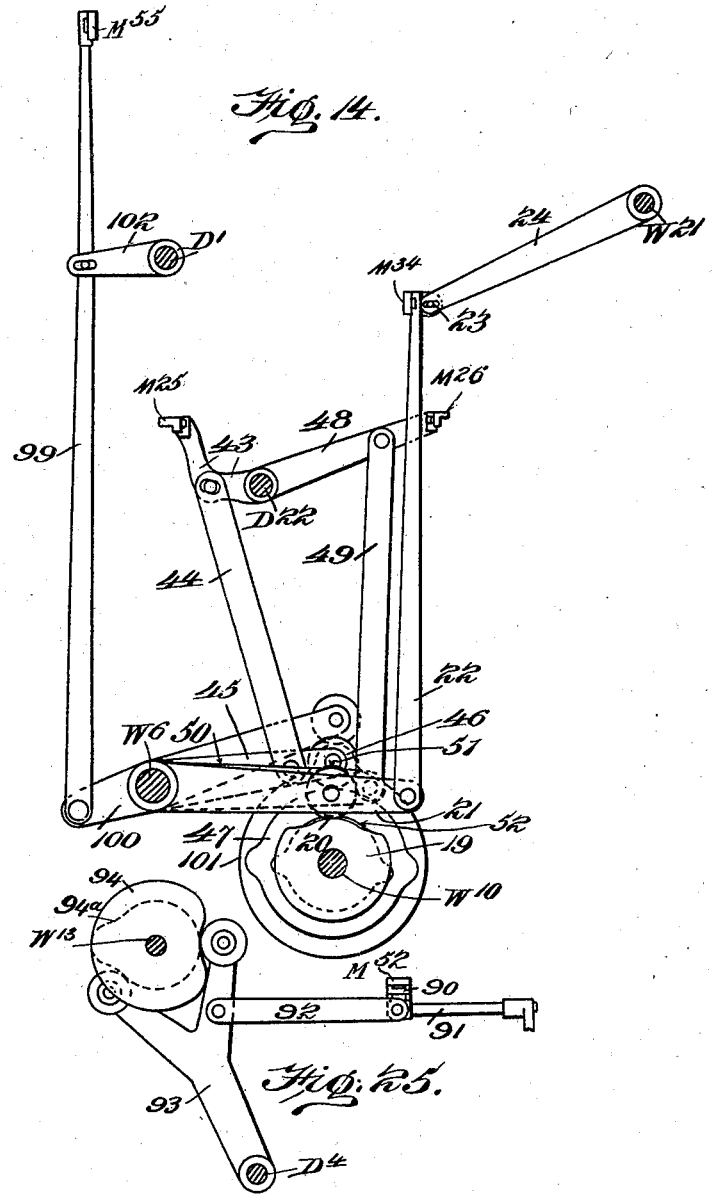

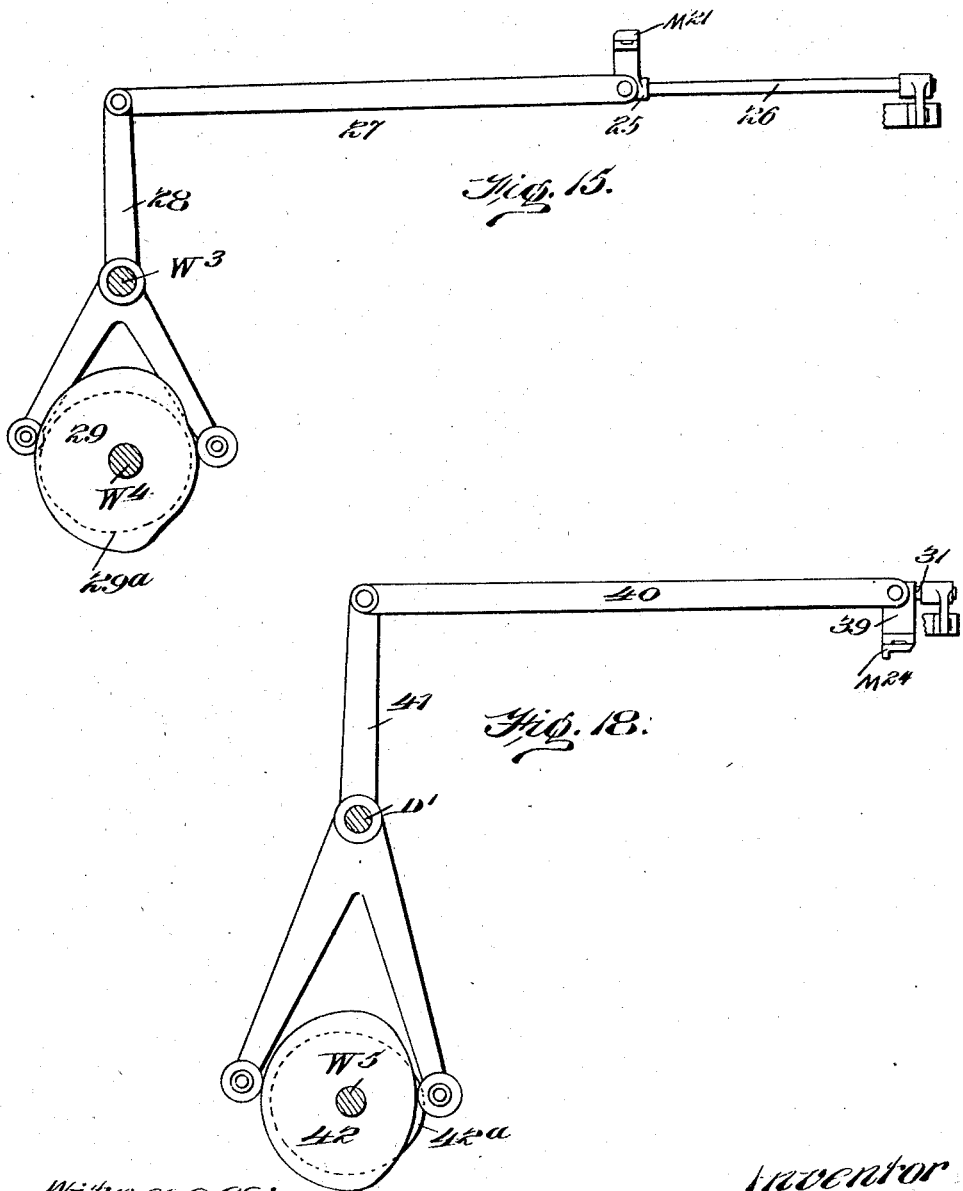

No. 705,539. Patented July 22, 1902.
A. MATITSCH.
LACE MAKING MACHINE.
(Application filed Oct. 31, 1901.)
(No Model.) 15 Sheets—Sheet 11.

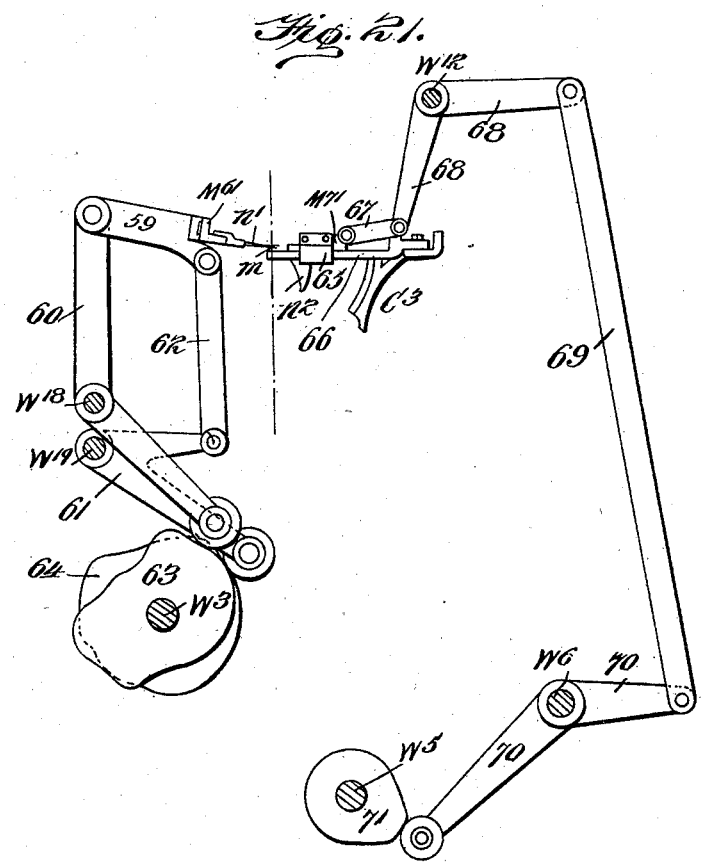

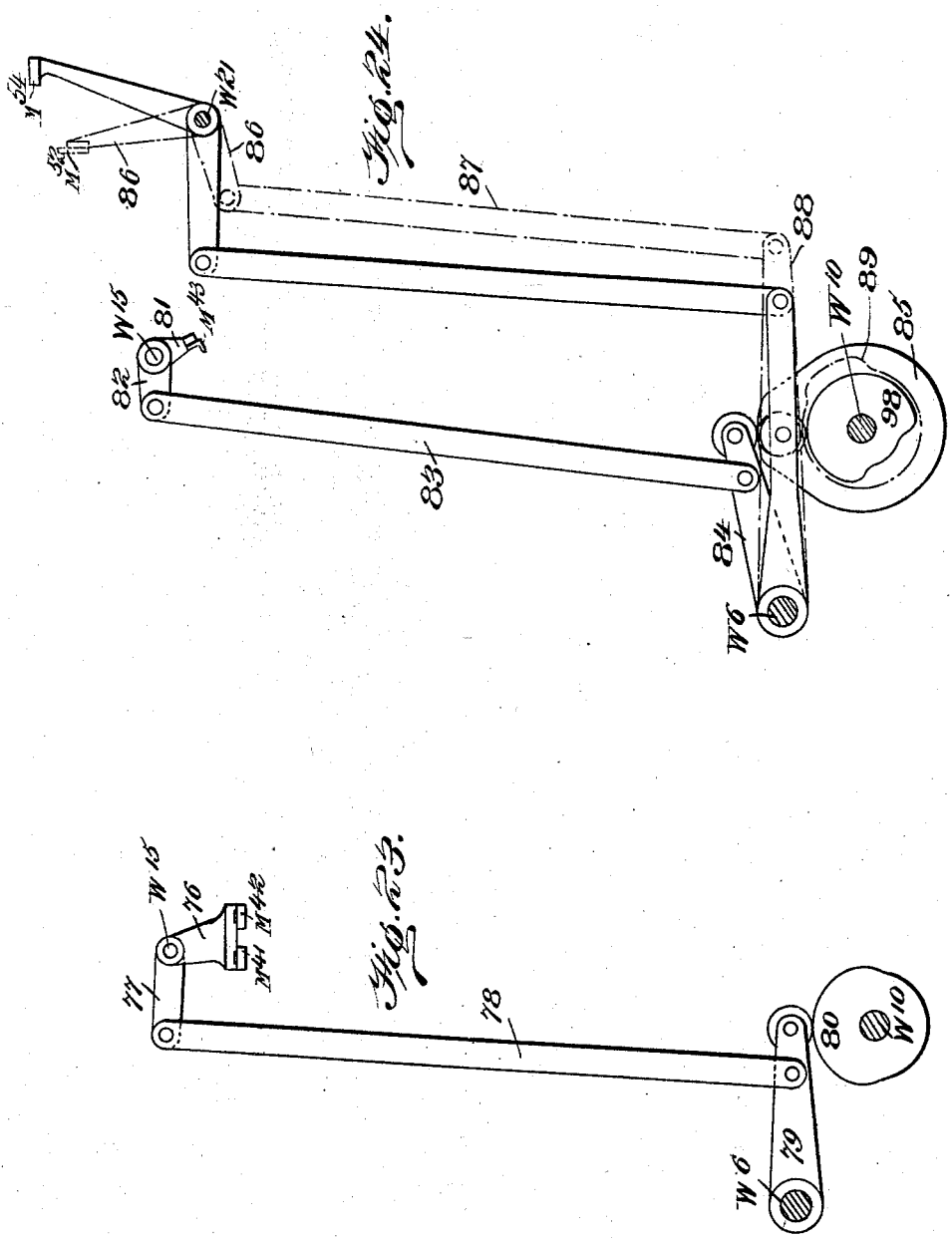

No. 705,539. Patented July 22, 1902.
A. MATITSCH.
LACE MAKING MACHINE.
(Application filed Oct. 31, 1901.)
(No Model.) 15 Sheets—Sheet 14.
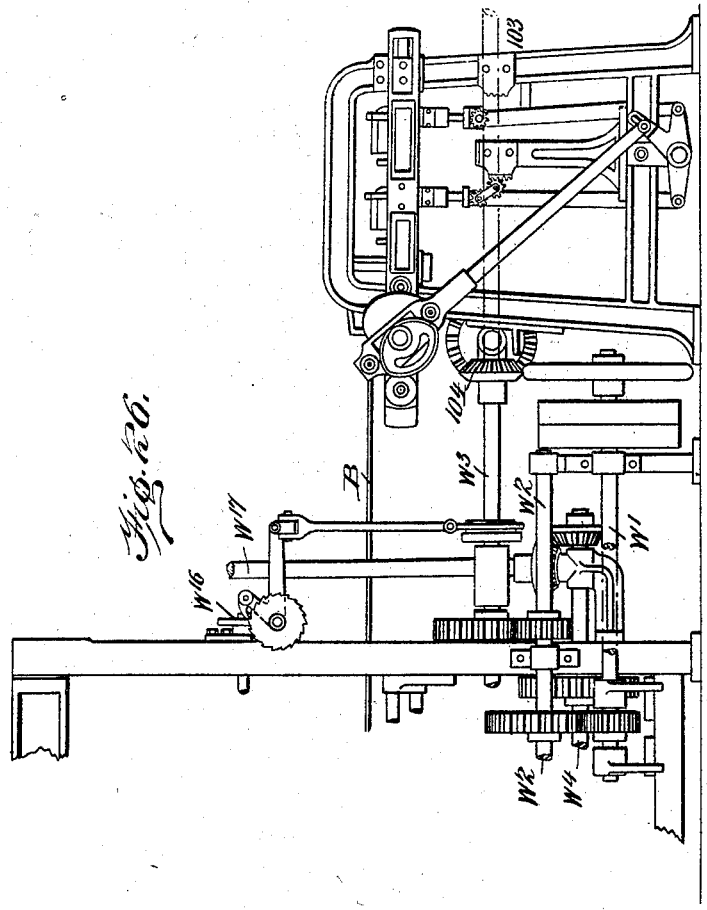
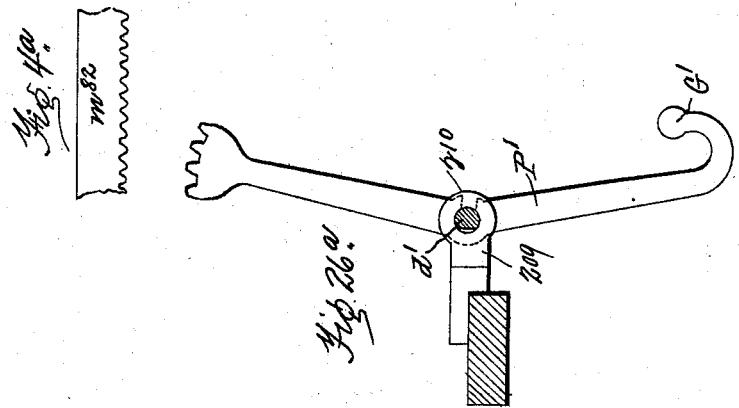
Witnesses:
H. G. Dieterich
B. K. Sommers
Inventor
August Matitsch
By
Attys

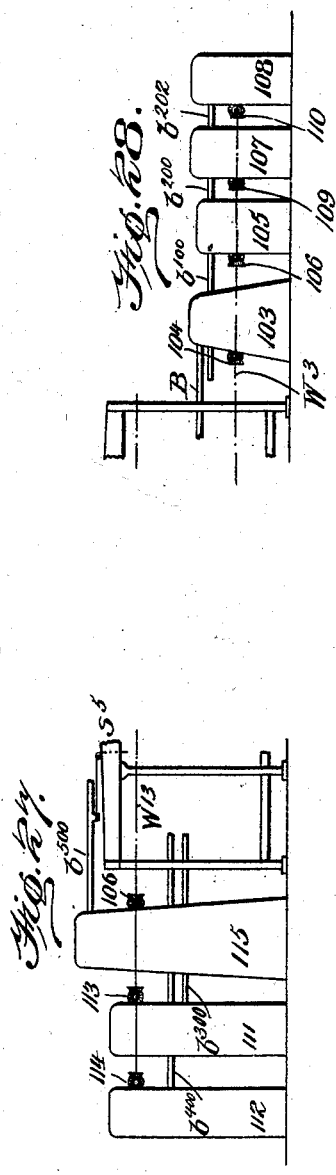

UNITED STATES PATENT OFFICE.

AUGUST MATITSCH, OF VIENNA, AUSTRIA-HUNGARY.

LACE-MAKING MACHINE.

SPECIFICATION forming part of Letters Patent No. 705,539, dated July 22, 1902.

Application filed October 31, 1901. Serial No. 80,668. (No model.)

*To all whom it may concern:*

Be it known that I, AUGUST MATITSCH, a subject of the Emperor of Austria-Hungary, and a resident of Vienna, in the Empire of Austria-Hungary, have invented certain new and useful Improvements in and Relating to Lace-Making Machines, of which the following is a specification.

This invention relates to a machine for producing pillow-lace, which resembles those described in the specifications of British Letters Patents previously granted to me and numbered 3,987 of 1897, 16,971 of 1897, 20,540 of 1898, and 16,669 of 1899, but which, first, the connection of the pushers and needles with the jacquards acting upon them (which are bottom-bar jacquards instead of, as hitherto, Manchester jacquards provided above the machine) is effected by peculiarly-shaped thin bars (hereinafter called "lifting-bars") instead of by cords, so that the disadvantages of cords (elongation and contraction resulting from the action of the weather, as well as breaking) are obviated; second, the speed of the machine is doubled by providing two jacquards for the middle pushers and causing them to lift pawls connected to the slides thereof instead of causing the slides themselves to be lifted by a single jacquard; third, instead of one group of needles, there are employed three groups of needles, of which two (the front and back groups of needles, hereinafter called the "adjusting-needles") separate from one another and adjust the threads that form the twists, so that they are lifted in a proper and certain manner by the third group of needles, (hereinafter called the "lifting-needles,") which lift the threads at any desired times and to any desired heights and then hold them raised as long as desired; fourth, a bar provided with teeth is used for the purpose of preventing the threads of the back carriages, after the needles that serve for separating and adjusting them have been inserted, from being moved laterally above these needles, which would cause the lifting-needles to be incorrectly inserted; fifth, the lifting-needles instead of being raised by vertically mounted and guided bars are raised by horizontally mounted and guided bars, whereby the power necessary for working the machine is considerably reduced; sixth, the comb-teeth are formed in such a way that they can be embedded at both ends in metal by casting it about them, so that they cannot be shifted and that the carriages will be prevented from being shifted laterally, and thereby going into wrong slots on passing from one comb into another; seventh, instead of, as in the machines described in the aforesaid specifications, carriages that end upward in points and serve for guiding the threads and which in consequence of their height shake at their points, whereby certainty of insertion of needles, and consequently correct raising of the twists, is rendered impossible, carriages having truncated upper edges are employed; eighth, peculiarly-formed connections are used between the pushers and needles and the slides for the purpose of enabling each pusher and each needle to be easily removed from the machine independently of the others; ninth, the pawls for raising the needles are provided with stepped projections at the parts on which the longitudinal bar acting on them presses, so that only one longitudinal bar is required for operating the pawls and only one pawl is necessary for each needle.

Figure 1 of the drawings shows the essential parts of a machine according to this invention in cross-section. Fig. 2 shows a portion of one of the lifting-bars, and Fig. 3 shows a portion of a lifting-bar of another kind. Fig. 4 illustrates diagrammatically a known connection between a pusher-slide and the wire of a Manchester jacquard. Fig. 4$^a$ shows a portion of the bar $m^{82}$. Fig. 5 illustrates diagrammatically the connection between a lifting-bar and a bottom-bar jacquard. Fig. 6 is an enlarged end view showing the adjustable mounting for the combs. Fig. 7 shows the means for shifting the combs. Fig. 8 is a side view of the loom, showing the driving mechanism and shifting devices of Fig. 7 in side elevation. Fig. 9 shows the means for actuating the rollers. Fig. 10 shows the cam motion to actuate the bars $M^{12}$; Fig. 11, a similar mechanism for the bars $M^{72}$ and $M^{13}$. Figs. 12 and 13 show similar devices for moving the bars $M^3$, $M^{32}$, and $M^{33}$; Fig. 14, the cam mechanism to operate the bar $M^{34}$; Fig. 15, the operating mechanism for bar $M^{21}$; Fig. 16, that for bar $M^{22}$; Fig. 17, that for bar $M^{23}$, and Fig. 18 that for bar $M^{24}$. Fig. 19 is a diagram of the lifting-bars and their projections; Fig. 20, the mechanism to move the shafts $D'$, $D^{21}$, $D^{22}$, and $D^3$ and their connected parts. Fig. 21 shows the mechanism to operate the lace-holding needles $n'$ and $n^2$. Fig. 22 shows the means for operating the serrated bar $m^{82}$ on the lace-holding needles; Fig. 23, mechanism to operate the bars $M^{41}$ and $M^{42}$; Fig. 24, that for operating the bars $M^{43}$ and $M^{54}$, and Fig. 25 that for the bars $M^{52}$. Fig. 26 is a partial front elevation showing the driving mechanism at the end of the machine shown in Fig. 8 and also a dropper-jacquard for operating the pattern thread-bars B. Fig. 26$^a$ is a detail view showing the manner of mounting the pushers. Figs. 27 and 28 are diagrams illustrating the arrangement of the jacquards employed.

As will be seen from Fig. 1, three combs are, as previously employed, for receiving and guiding the carriages—namely, a front comb $C'$, a middle comb $C^2$, and a back comb $C^3$. The teeth of the combs are embedded at the places marked $e'$-$e^7$ in tin cast about them. By pouring molten tin between the blades at $e'$-$e^7$, instead of at $e'$, $e^4$, and $e^7$ only, as previously, the carriages are caused to be firmly guided between the comb-teeth throughout their entire course and the several teeth are prevented from altering their relative positions. It is impossible, therefore, for the carriages in passing from one comb to another to move laterally and enter the wrong slots. The combs are, as before, arranged on the same arc of a circle in such a manner that a vertical line drawn from the center $m$ of the said circle will pass through the center of the vacant space between the front comb and the middle comb. In this intermediate space and immediately below the combs $C'$ and $C^2$ there are, as usual, arranged the top or pattern bars (hereinafter called "pattern-bars") B with their bearings.

The combs $C'$, $C^2$, and $C^3$ are mounted for adjustment as shown in Fig. 6 of the drawings. Each comb has an arm $c'$, $c^2$, or $c^3$ at each end, mounted on a stud $W^{15}$. The combs $C'$ and $C^3$ are moved by the mechanism shown in Figs. 7 and 8, which are respectively a partial plan and an elevation of the right-hand end of the machine. At each end of the machine there is a cam-shaft $W^{20}$, carrying two cams $C^{11}$ and $C^{33}$, which operate the combs $C'$ and $C^3$, respectively, through levers $C^{111}$ and $C^{333}$. The shaft $W^{20}$ is driven from the main shaft $W'$ by the following mechanism: The main driving-shaft $W'$ has a gear 204, that drives one 203 on the shaft $W^2$, that carries the gear 205, which transmits motion to the gear 202 on the shaft $W^4$. The gear 202 also drives one 201 on the shaft $W^5$, that carries a bevel-pinion 206, that meshes with the bevel-wheel 200, that is on and drives the vertical cam-shaft $W^{20}$. Under the comb $C^2$ there is also, as in roller-machines, a toothed driving-roller $R^2$, whose teeth engage with the teeth of the toothed arcs on the carriages. By rotating the toothed roller the carriages engaged by it will be brought from the front comb into the middle comb, and vice versa. The roller $R^2$ is rotated to and fro as required from the shaft $W^5$ at each end by two cams $R^3$ and $R^4$, Fig. 9, acting on rollers carried by two arms of a compound lever $R^5$, loosely mounted on the shaft $W^3$ and connected by a link $R^6$ with a toothed sector $R^7$, mounted loosely on the pin $W^{15}$ and in gear with the roller $R^2$.

At the beginning of the operation there is a series of carriages in the front comb and a second series in the back comb, but none in the middle comb. The carriages whose threads are to form twists are brought simultaneously from the front and back combs into the middle comb. The transfer of the carriages from the middle comb to the front and back combs is also effected simultaneously, and at each transfer all the carriages are moved out of the middle comb. In each slot of the front comb there is a pusher or picker $P'$, (hereinafter called a "front pusher,") in each slot of the middle comb a pusher $P^2$, (hereinafter called a "middle pusher,") and in each slot of the back comb a pusher $P^3$, (hereinafter called a "back pusher.") The upwardly-projecting ends of the pushers engage the teeth of the toothed arcs of the carriages, so that the carriages are secured and guided by the pushers. Fig. 1 shows that the operative ends of the pushers $P'$ are small toothed arcs like those of the pushers $P^3$. The pushers are loosely mounted on shafts $d'$, $d^2$, and $d^3$, so that each pusher can be rotated independently of the others. The shafts $d'$ and $d^3$ are rigidly connected to the combs $C'$ and $C^3$, respectively. To the combs $C'$ and $C^3$ are attached brackets $d^{11}$ and $d^{33}$, in which the shafts $d'$ and $d^3$ are respectively fixed. These shafts and the pushers carried by them will therefore be moved simultaneously with these combs and, like them, in the longitudinal direction of the machine.

Since the pushers, lifting-needles, slides, and pawls come very close one to another in the machine, a suitable connection of the same is of particular importance, as the certainty of operation of the machine is thereby very considerably affected. The parts mentioned and their connections must have no projecting portions that could strike together, and thereby interfere with their movements. Moreover, they must not press one against another. On the contrary, each part must be adapted to move easily. Finally, it must be possible to remove each pusher, lifting-needle, slide, and pawl from the machine independently of the others. If rivets were used, it would be found that in consequence of the pushes that are continually exerted upon them and are continuously changed in direction they would soon wear and might become loose and fall out, since they would necessarily be of small dimensions, so that interruptions in the working of the machine and damage to the pushers might occur. A certain connection between the parts in question and the slides that satisfies all requirements is obtained in this machine by making that portion of each pusher, lifting-needle, or pawl at which the connection is to be made circular and placing it in a guide of the corresponding slide.

In Fig. 1 the consequently circular ends of the pushers, to which the slides are connected, are indicated by dotted lines at $G'$ $G^2$ $G^3$ and that of the lifting-needle shown at $G^5$. The guiding of these ends is effected by providing in the slides to be jointed notches in which the rounded ends of the pushers, lifting-needles, or pawls fit. To each side of this part of each slide there is riveted a thin plate for the purpose of covering the notch, so that the ends of the pushers, lifting-needles, and pawls placed in the notches cannot come out.

The riveted plates must be so long that when two adjacent slides are being moved into two opposite extreme positions the riveted plates will always overlap, and consequently their ends can never strike together.

The several pushers are separated one from another at the parts thereof through which pass the shafts $d'$, $d^2$, and $d^3$ by guide-blades 207 208 209, that are placed between them and form combs by being embedded in cast-tin. The blades are perforated, and the shafts $d'$, $d^2$, and $d^3$ are pushed through the circular holes formed thereby.

In order to enable the pushers to be mounted on their shafts, the pushers are slotted at the parts of them that are placed on the shafts, as indicated by dotted lines in Fig. 1, at 210, 211, and 212.

Each shaft is not perfectly cylindrical, but is flattened on one side, and the slots in the pushers are made in such a way that the pushers can be mounted on their shafts by means of them. When this has been effected, the shafts are rotated and fixed with their flat surfaces opposite to the slots in the pushers. When the shafts are in this position, the pushers cannot be removed from their shafts by means of the slots. Consequently they are securely mounted on the shafts.

In order to remove a pusher—for example, $P'$—its shaft $d'$ is rotated, so that the pusher can be removed therefrom. To render this possible, it must also be disconnected from its slide $B'$. This is effected by raising the slide until the end of the pusher comes out of the guide $G'$ in which it has been engaged.

Fig. 1 shows a carriage $A'$ in its front position and held by a pusher $P'$ in the front comb. In the middle comb a carriage $A^2$ is shown in the middle position—i. e., completely within the comb—and held therein by a pusher $P^2$ in such a way that it is out of contact with the toothed roller $R^2$. In the back comb a carriage $A^3$ is shown in the rear position—i. e., completely within the comb—and held by a pusher $P^3$.

To each pusher there is connected a slide $B'$, $B^2$, or $B^3$. The slides are provided with projections N, acted upon by longitudinal bars M, which are arranged above and below the slides and by means of which the slides are held fast and are moved toward and away from the combs.

The raising or correct upward rotation of the slides, and consequently their holding fast or shifting, is effected by the shifting of the lifting-bars, and consequently by the action of the bottom-bar jacquards connected with the lifting-bars. All the slides of a set are connected with a separate bottom-bar jacquard. Since each slide (or wire equivalent) of a bottom-bar jacquard can be operated independently of the other slides thereof, the slide B connected therewith will be held fast or moved in accordance with the jacquard-card, and the carriages which are connected with the slides B by means of the pushers can consequently be held fast in the combs or be transferred from one comb to another, as desired.

At the commencement of the operation the jacquards connected with the slides come into action, and thereby determine which carriages are to be held in the outer positions and which must be brought into the middle position. In order to transfer a carriage $A'$ to the middle comb, the slide $B'$ connected therewith is raised through the action of the corresponding jacquard, so that its projection $N^{12}$ comes between longitudinal bars $M^{12}$ and $M^{13}$, which are rigidly connected together, and the projection $N^{11}$ is raised higher than a longitudinal bar $M^{11}$.

In order to hold a carriage $A'$ in the front position, the corresponding slide must not be raised. In this case the projection $N^{11}$ is on a level with the longitudinal bar $M^{11}$, and the slide is prevented from moving forward by the longitudinal bar $M^{11}$. The stop-bar $M^{14}$ is fixed and prevents the slide from moving too far backward through the speed of working. As soon as the lifting of the slides has been effected the bar $M^{11}$ moves about one-sixteenth of an inch backward, and the projections $N^{11}$ of the raised slides are thus caused to become located over the bar $M^{11}$, which prevents the raised slides from falling, so that the operation of the jacquard can then cease. The movement of the bar $M^{11}$ now ceases. The bars $M^{12}$ and $M^{13}$ now begin to move forward, and the bar $M^{13}$ pushes the raised slides forward—i. e., toward the combs—whereby the carriages connected thereto are moved to the middle comb.

The raised slides $B^3$ hold the carriages fast in the back comb in consequence of the fact that their projections $N^{33}$ are at the same level as and behind a longitudinal bar $M^{34}$, and are thereby prevented from moving forward. The slides are prevented from moving too far backward in consequence of the speed at which they work by a longitudinal stop-bar $M^{35}$. After the raising the longitudinal bars $M^{31}$, $M^{32}$, and $M^{33}$ begin to move forward. The bars $M^{32}$ and $M^{33}$ are rigidly connected together. Since the projections $N^{31}$ of the unlifted slides are between the bars $M^{31}$ and $M^{32}$, these slides are pushed forward and bring their pushers and carriages from the back comb to the middle comb. The bars $M^{11}$, $M^{12}$, and $M^{13}$, that actuate the front pushers, are operated from the shaft $W^4$ at each end by two pairs of cams 1 and $1^a$ and 2 and $2^a$, Figs. 10 and 11, which act, respectively, on compound levers 3 and 4, mounted loosely on the shaft $W^3$ and connected by links 5 and 6 to carriages 7 and 8, carrying the bars and mounted to slide on a fixed rod 9. The bars $M^{31}$, $M^{32}$, and $M^{33}$ are operated similarly from the shaft $W^5$ by means of cams 10 and $10^a$ and 11 and $11^a$, Figs. 12 and 13, levers 12 and 13, mounted loosely on a shaft $D'$, links 14 and 15, and carriages 16 and 17, mounted to slide on a fixed rod 18.

The effect on the corresponding carriages of raising the front slides or allowing them to remain at rest is the reverse of the effect of so treating the back slides. Raising front slides causes the respective carriages to be transferred from the front comb to the middle comb, or vice versa, and allowing front slides to remain at rest causes the respective carriages to be held fast in the front comb. In the case of the back slides the opposite occurs. Consequently the raised slides hold the carriages fast in the back comb and the unlifted ones cause them to be transferred from the back comb to the middle comb, or vice versa. The reason for this is that in consequence of it and of the manner in which the pawls of the middle pushers are operated, as hereinafter described, to cause these pushers to coöperate with those of the front and back combs the pattern-cards have to be perforated in such a manner that faults in the cards of the jacquards belonging to the three slides can be detected with certainty on suitably placing the cards one upon another.

When a carriage has to be brought from the front comb into the middle comb, or vice versa, there must be a hole for the corresponding pusher both in the pattern-card of the front-pusher jacquard and in that of the middle-pusher jacquard. When, on the other hand, a carriage has to be brought from the back comb into the middle comb, or vice versa, there must be no hole for the corresponding pusher either in the pattern-card of the back-pusher jacquard or in that of the middle-pusher jacquard. From this it will be seen that there must be holes for the coöperating pushers in the cards for the front-pusher and middle-pusher jacquards, but, on the other hand, there must be no holes for coöperating pushers in the cards of the back-pusher and middle-pusher jacquards. Consequently if the cards for the front-pusher and middle-pusher jacquards be laid one upon another in such a way that the places where the holes for the coöperating pushers should be coincide there must be a hole through the two cards for the pushers that effect the transfer of the carriages from the front comb to the middle comb, or vice versa. On the other hand, in the cards for the back-pusher and middle-pusher jacquards there must be no hole through the two cards for the coöperating pushers when a carriage has to be transferred from the back comb to the middle comb, or vice versa. If it be found, therefore, that when two corresponding cards of the front-pusher and middle-pusher jacquards are placed one upon the other the card of the front-pusher jacquard has a hole, while that of the middle-pusher jacquard has none, this will indicate a fault. If these cards are to effect the transfer of a carriage from the front comb to the middle comb, this means either that the middle pusher, which has to receive the carriage, would not be moved toward the front comb or that the front pusher would transfer a carriage to the middle comb, which ought not to be brought there. Similar remarks apply to all remaining cases in which the superposed cards do not correspond. It is therefore possible simply by laying the cards one upon another to discover the faults in them. Faults that occur in punching the cards and also those that the draftsman has made in the preparation of the diagrams for the card-puncher are thus rendered visible. This method of comparing the cards is much quicker and more certain than the usual reading off of the cards.

In order to bring a carriage from the front or the back position to the middle position, the corresponding outer pusher must be rotated toward the middle comb. A similar movement, but in the opposite direction, must occur in order to bring a carriage from the middle-position to the outer position.

In order to be able to work quickly and surely, it is necessary that there should be a suitable interval between each descent and the next following raising of each slide and pawl. The raised slides and pawls must therefore fall as soon as possible after the beginning of the return to the original position and be raised before the arrival there. To enable this to be done in the case of the slides $B'$, the longitudinal bar $M^{12}$ must be formed, as shown, with a forward inclination downward, so that during its backward movement it will exert little or no friction on the backwardly-moving slides $B'$ to retard their descent. Furthermore, the bar $M^{11}$ should be pushed quickly forward at the proper time, so as to move away from the projections $N^{11}$ immediately after the commencement of the backward movement of the slides. To secure this in the case of the back-pusher slides $B^3$, the bar $M^{34}$ is raised above the projections $N^{33}$ of the raised slides immediately after the commencement of the return movement of the unlifted slides into their initial positions. Furthermore, the bar $M^{31}$ moves more quickly backward than the bar $M^{32}$ at this moment, so as to move away from under the projections $N^{31}$ of the raised slides. Finally, the bar $M^{33}$ is formed so as to prevent the projections $N^{31}$ of slides released by the bar $M^{34}$ from moving over the bar $M^{32}$ at the moment of release and before their projections $N^{31}$ fall between the longitudinal bars $M^{31}$ and $M^{32}$. The bar $M^{34}$ is worked by a cam 19, Fig. 14, on a shaft $W^{10}$, driven from the shaft $W^5$ through a toothed wheel mounted on a shaft $W^6$. The cam 19 acts upon a roller 20, mounted on a lever 21, loosely mounted on the shaft $W^6$ and jointed to a bar 22 at its upper end, carrying the bar $M^{34}$ and having a pin-and-slot connection 23 with an arm 24, which is loosely mounted on an axle $W^{21}$ and serves to limit the forward and backward movements of the upper end of the bar 22.

The slides $B'$ and $B^3$ require to be selected by the jacquard only for holding the carriages in the outer combs. For bringing the carriages out of the middle comb no selection of the slides $B'$ and $B^3$ by the jacquards is required, since carriages can be brought from the middle comb only into the slots of the outer combs that were already empty before the commencement of the transfer of the carriages into the middle comb or were emptied by the transfer. If in bringing in the carriages there have been moved toward the middle comb all the outer pushers that have no carriages to hold fast in the outer combs— i. e., all those that are not connected to any carriages—all the pushers that can bring out carriages have been brought toward the middle comb. All these pushers are returned to their original positions at the proper moment when the carriages leave the middle comb. All the carriages coming from the middle comb are therefore engaged by pushers and are brought into the outer combs.

Since carriages are simultaneously brought from the front and back positions into the middle position, and vice versa, it follows that simultaneously with each of these movements some of the slides $B^2$, acting upon the middle pushers, have to be moved forward and some of them have to be moved backward. Consequently in the same time in which the jacquards belonging to the slides $B'$ and $B^3$ have to come into operation the jacquards of the slides $B^2$ must act twice. The first time they effect the selection of the slides to be moved forward or backward in order to bring the carriages from the outer combs into the middle comb. The second time they have to come into action in order to select the slides $B^2$ that have to bring carriages into the front and back combs. If this were to be effected in a manner similar to that used in the case of the slides of the outer pushers, certainty of action of the machine would necessitate a lower speed, and the result thereof would be a reduction of the output. In order to obviate this, there are connected to each middle slide two pawls $K^{21}$ and $K^{22}$, which are provided with projections $r^{21}$ and $r^{22}$, $r^{23}$, and $r^{24}$, upon which act longitudinal bars. Of these pawls the pawls $K^{21}$ come into operation for bringing carriages into the middle comb and the others, $K^{22}$, for bringing carriages out of the middle comb. Sufficient time is thereby gained for their double rising and falling, so that the machine can work with certainty at a considerably-higher speed than without them. In the case of the slides $B^2$ the jacquards act through their lifting-bars upon their pawls $K^{21}$ and $K^{22}$ instead of on the slides themselves. At the beginning of the operation all the pushers $P^2$ are in their middle positions.

The selection of the pawl by the jacquard for bringing carriages from the front and back combs into the middle comb is effected when the pushers $P^2$ are in this position. The jacquard raises the pawls $K^{21}$ that have to bring carriages from the back comb, but not those that have to bring carriages from the front comb. The pawls $K^{22}$, which act only for bringing carriages out of the middle comb, remain at rest. After the pawls have been raised the bar $M^{21}$ first moves forward and comes under the projections of the raised pawls $K^{21}$, so that these pawls are thereby prevented from falling, and the lifting-bars in question can then be put out of operation. Thereupon the longitudinal bar $M^{22}$ begins to move backward. The lifting-bars $b^{21}$ are shifted by one single-lift jacquard and the lifting-bars $b^{22}$ by another single-lift jacquard. (Instead, however, of two single-lift jacquards, as I prefer, there might be used one double-lift jacquard.) The longitudinal bar $M^{21}$ presses against the projections $r^{21}$ of the unlifted pawls $K^{21}$ and moves the slides connected therewith forward and the corresponding pushers toward the front comb. The longitudinal bar $M^{22}$ presses against the projections $r^{22}$ of the raised pawls $K^{21}$, and thus moves the slides connected therewith backward and the corresponding pushers toward the back comb. Through this movement the pushers connected to the slides $B^2$ are moved and placed in such a way that the teeth of the carriages come to be over the projecting ends of the pushers. Thereupon the said bars return to their original positions. On their return the bars $M^{21}$ and $M^{22}$ press, respectively, against the projections $N^{21}$ and $N^{22}$ of the slides $B^2$, whereby their return to the middle position is effected. The pushers $P^2$ are thus rotated, and consequently engage in the toothed arcs of the carriages brought out of the outer combs, and on their return to their original positions (which takes place at this time) bring these carriages into their middle positions. In the meantime the jacquard has acted upon the pawls $K^{22}$, so as to effect their selection, and the corresponding slides are then moved in a manner similar to that of the previous movement, with the exception that now the bars $M^{23}$ and $M^{24}$ act on the projections $r^{23}$ and $r^{24}$ of the pawls $K^{22}$ and the projections $N^{23}$ and $N^{24}$ of the slides $B^2$. The bars $M^{21}$ and $M^{22}$ move, respectively, in the same direction as the bars $M^{23}$ and $M^{24}$. During the movements of pushers $P^2$ into their middle positions the bars $M^{21}$ and $M^{23}$ move faster than the bars $M^{22}$ and $M^{24}$. Consequently the pawls $K^{21}$ or $K^{22}$, that have been raised, all fall before they have reached their original, normal, or middle positions. The edges of the bars $M^{22}$ and $M^{24}$, directed toward the projections $r^{22}$ and $r^{24}$, are inclined as shown, so that there will be as little friction as possible between them to retard their fall when the bars $M^{21}$ and $M^{23}$ have cleared the projections $r^{21}$ and $r^{23}$. Over each pawl there is a longitudinal bar $M^{25}$ or $M^{26}$, the descent of which prevents the pawls from falling too late. In consequence of this arrangement, therefore, a considerable pause occurs between the rising and falling of the pawls, so that the machine can be kept at a high speed without risking safety.

The movements of the bars $M^{21}$, $M^{22}$, $M^{23}$, $M^{24}$, $M^{25}$, and $M^{26}$ are effected by the following means: The bar $M^{21}$ is mounted at each end on a carriage 25, Fig. 15, adapted to slide on a fixed bar 26, which is parallel to and on a level with the bar 9. Each carriage 25 is connected by a link 27 to a compound lever 28, which is loosely mounted on the shaft $W^3$ and carries rollers acted upon by cams 29 and $29^a$ on the shaft $W^4$. The bar $M^{22}$ is similarly operated at each end by means of a carriage 30, Fig. 16, a bar 31, a link 32, a compound lever 33, mounted loosely on the shaft $D'$, and cams 34 and $34^a$ on the shaft $W^5$. The bar $M^{23}$ is similarly operated at each end by means of a carriage 35, Fig. 17, mounted on the bar 26, a link 36, a compound lever 37, mounted loosely on the shaft $W^3$, and cams 38 and $38^a$ on the shaft $W^4$. The bar $M^{24}$ likewise is mounted at each end on a carriage 39, Fig. 18, which is adapted to slide on the bar 31 and is connected by a link 40 with a compound lever 41, which is loosely mounted on the shaft $D'$ and is operated by cams 42 and $42^a$ on the shaft $W^5$. The bar $M^{25}$ is carried at each end by a lever 43, Fig. 14, which is loosely mounted on a shaft $D^{22}$ and is connected by a link 44 with a lever 45, loosely mounted on the shaft $W^6$ and carrying at its free end a roller 46, acted upon by a cam 47 on the shaft $W^{10}$. The bar $M^{26}$ is similarly operated by means of a lever 48, mounted on the shaft $D^{22}$, a link 49, a lever 50, mounted on the shaft $W^6$, a roller 51, and a cam 52.

In order to bring a carriage from the front comb into the middle comb, the pusher $P'$, that engages with the said carriage, is rotated inwardly and downwardly, so that the carriage is engaged by the driving-roller $R^2$ before the pusher $P'$ has completed its movement toward the middle comb and has come out of contact with the carriage, which is delivered by the driving-roller to the corresponding pusher $P^2$, which has been moved forward in the meantime, and then brings the carriage at once into the middle position.

In order to bring a carriage from the back comb into the middle comb, the corresponding middle pusher $P^2$ is moved backward by the action of the jacquard, and the corresponding back pusher $P^3$ is rotated forward. As soon as the carriage is thereby caused to enter the middle comb it is engaged by the middle pusher, which is then rotating forwardly and brings the carriage into the middle position. The transfer from the middle comb to the front and back combs is effected in an exactly similar manner, but the movements are in the reverse directions.

The front and back combs are moved laterally each time before the carriages come into and out of the middle comb. The lateral movement of these carriages is thereby effected.

In order to raise the slides, they are connected in existing machines with the wires of the jacquards by means of cords. The use of cords has, however, many disadvantages, especially when there is such a large number of cords as is necessary in these machines. Cords are always uncertain in action, since they are affected by the weather and also soon wear and break, which causes stoppages in the working of the machine and damage to the carriages and the pushers. They have consequently to be renewed after being used for a year or two. The employment of a satisfactory substitute will therefore considerably increase the certainty of operation and the output of the machine.

As is known, a lace-making machine of the kind referred to produces a large number of strips of lace at one time. In each of these strips the threads of the same place-number make the same movements at the same time. This fact enables the machine to be provided with bottom-bar jacquards instead of Manchester jacquards and the aforesaid lifting-bars to be used instead of cords for raising the slides and pawls.

The slides $B'$ and $B^3$, connected to the pushers $P'$ and $P^3$, and the pawls $K^{21}$ and $K^{22}$, connected to the slides $B^2$, are each provided with a downwardly-extending projection $a'$, $a^3$, $a^{21}$, or $a^{22}$, respectively, of about six millimeters in width. The projections of each denomination—i. e., the projections $a'$, $a^3$, $a^{21}$, and $a^{22}$, respectively—are arranged at ninety-six different distances from the point of connection between the corresponding slide and its pusher. All the projections of each denomination are for each repeat of ninety-six slides located on twelve parallel vertical planes inclined to the lifting-bars. The distance between every adjacent two of these planes is twelve millimeters. With this distribution in a machine with two thousand eight hundred and eighty needles when a repetition of the pusher and needle movements in similar order is required for every ninety-six needles there are in the first repeat on the first plane the projections 1 13 to 85; on the second plane, the projections 2 14 to 86; on the third plane, the projections 3 15 to 87; on the fourth plane, the projections 4 16 to 88; on the fifth plane, the projections 5 17 to 89; on the sixth plane, the projections 6 18 to 90; on the seventh plane, the projections 7 19 to 91; on the eighth plane, the projections 8 20 to 92; on the ninth plane, the projections 9 21 to 93; on the tenth plane, the projections 10 22 to 94; on the eleventh plane, the projections 11 23 to 95, and on the twelfth plane, the projections 12 24 to 96. The succeeding twenty-nine repeats are similar and begin with 97 193, &c.

Under the slides or pawls of each kind there is arranged a horizontal angle-bar $S'$, $S^{21}$, $S^{22}$, or $S^3$, which is parallel to the longitudinal direction of the machine and can be moved up and down. For this purpose these bars are connected to arms $H'$, $H^{21}$ $H^{22}$, and $H^3$, which are rigidly connected to shafts $D'$, $D^{21}$, $D^{22}$, and $D^3$, so that the up-and-down movement of the bars $S'$, $S^{21}$, $S^{22}$, and $S^3$ and of the parts of the machine carried by them is effected by the partial rotation of these shafts. The bars carry at intervals of six hundred millimeters combs $T'$, $T^{21}$, $T^{22}$, and $T^3$, in which are mounted their lifting-bars $b'$, $b^{21}$, $b^{22}$, and $b^3$, that extend throughout the entire length of the machine and which are seen in section in Fig. 1. The lifting-bars are only 0.6 millimeters thick and their number is equal to that of the comb-slots corresponding to which a repetition of the pusher and needle movements is effected in the same order. For the machine mentioned, as an example, there would consequently be required ninety-six lifting-bars for the movement of the slides $B'$, ninety-six for the movement of the slides $B^3$, and one hundred and ninety-two for that of the pawls of the slides $B^2$. Fig. 2 shows a portion of such a lifting-bar $b$ in side elevation. These lifting-bars have on their upper sides projections $h'$, $h^{21}$, $h^{22}$, and $h^3$ of the same dimensions as those of the slides and pawls. Each of these projections of a lifting-bar is separated from the next one of the same bar by the same distance, (this would be fifteen centimeters in a sixteen-point machine—i. e., a machine in which there are sixteen needles per 2.5 centimeters—if the repetition occurs after ninety-six needles.)

The lifting-bars are each connected at one end to a bottom-bar jacquard, such as used in the machine-lace industry, and at the other end to a spiral spring—that is to say, exactly like the bottom bars in English or twist-lace machines. The connection between a lifting-bar and a bottom-bar jacquard is illustrated diagrammatically in Fig. 5. $b$ indicates the lifting-bar, which is connected at one end to a spiral spring F and at the other end to the part or slide P of the bottom-bar jacquard corresponding to the wire of a Manchester jacquard. X indicates the needle of the slide P. Z indicates the jacquard-cylinder, which is moved up and down, and K indicates the pattern-cards. The needle X is on the rise of the cylinder Z raised or not, according as the pattern-card is perforated or not at the place in question. When the needle is not raised, the slide P is not raised, so that the bar M acts on the projection $n$ of the slide P and moves the slide P, and consequently the lifting-bar $b$, toward the right. When the bar M returns into its original position, the lifting-bar $b$ likewise returns into its original position in consequence of the action of the spiral spring. When, on the contrary, the needle X is raised, it raises the slide P, and the bar M passes under the projection $n$ toward the right, and consequently does not shift the slide P and the lifting-bar connected therewith. The lifting-bars are so arranged in the machine that from one projection of one slide to the next projection of the adjacent slide there are eight lifting-bars. If, therefore, the projection of the first slide coincides with the first projection of the first lifting-bar, the projection of the second slide coincides with the first projection of the ninth lifting-bar. If the first projection of the first lifting-bar lies under the projection of the first slide or its pawl, the second projection thereof must with this arrangement come under that of the ninety-seventh slide, $(1+1\times 96,)$ the third under that of the one hundred and ninety-third slide, $(1+2\times 96,)$ and so on to the two thousand seven hundred and eighty-fifth, $(1+29\times 96.)$ Furthermore, if the first projection of the second lifting-bar stands under the projection of the thirteenth slide or its pawl, its second projection must come under the one hundred and ninth slide $(13+1\times 96)$ and its third projection under the two hundred and fifth slide, $(13+2\times 96,)$ and so on to the two thousand seven hundred and ninety-seventh slide, $(13+29\times 96.)$ Fig. 19 is a diagram illustrating the arrangement of the slides and lifting-bars and their projections. The horizontal lines represent the slides and the thicker portion thereof their projections, while the vertical lines represent the lifting-bars and the thicker portions of the vertical lines the projections thereof.

The lifting-bars can be moved in the longitudinal direction of the machine to such an extent that after the movement their projections are clear of the projections of the slides or pawls, so that when the lifting-bars move upward these projections do not come into contact with each other, and consequently the corresponding slides or pawls cannot be raised.

Fig. 1 shows the lifting-bars raised by the angle-bars $S'$, $S^{21}$, $S^{22}$, and $S^3$, respectively.

The shafts $D'$, $D^{21}$, $D^{22}$, and $D^3$, that carry the arms $H'$, $H^{21}$, $H^{22}$, and $H^3$, are operated at each end by a cam 53, Fig. 20, fixed on the shaft $W^5$. This cam acts as a roller on a lever 54, which is loosely mounted on the shaft $W^6$ and has rigidly attached to it arms connected by links 55, 56, 57, and 58 to arms fixed on the shafts D', D²¹, D²², and D³, respectively.

Before the lifting-bars are raised they have been moved by means of the bottom-bar jacquards connected with them according to the pattern-cards in such a way that wherever a slide B' or B³ or a pawl K²¹ or K²² is to be raised the corresponding projection of the lifting-bar comes under the projection of the respective slide or pawl, so that in this case the lifting-bar when rising raises the slide. If the first projection of the lifting-bar 1 is under the projection of the corresponding slide 1, the latter will be raised. In the case just mentioned the distribution of the projections on the lifting-bars causes the slides 97 193 2785 also to be raised by the first lifting-bar—that is to say, thirty slides in all to be raised by the action of the first lifting-bar. The number of acting jacquard-slides is therefore only a thirtieth part of the number of jacquard-wires that the machine would require with the arrangement hitherto usual.

When there are, as stated, ninety-six lifting-bars and the projections of each set of slides or pawls are on twelve different planes, the jacquards may advantageously for the purpose of easily finding the positions in a card corresponding to any lifting-bar be so arranged that the cards will be punched in eight longitudinal rows and twelve columns side by side.

In ordinary twist-lace machines the needles that have to raise the twists and the threads (hereinafter called "pattern-threads") guided by the pattern-bars enter immedietely above the carriages between these threads in order to be in a position to raise them properly. The carriages whose threads form the twists stand in a machine according to this invention side by side in one line only in the middle position. Therefore in order to raise the twists the needles must be inserted when the carriages are in this position. The pattern-threads pass between the combs C' and C² from the pattern-bars to the crossing-point m and are then in a vertical plane passing through the point m and parallel to the longitudinal direction of the machine. They appear, however, in this plane as vertical lines only in the starting position—i. e., at the commencement of a repeat. In every other position in consequence of their lateral movement they form angles with these vertical lines. A pattern-thread must be raised vertically by the needle that is most nearly vertically over the hole of the pattern-bar B through which the thread upwardly issues. When a carriage passes over the pattern-bars on the way to or from the middle comb, the pattern-thread is raised vertically by this carriage from the hole of the pattern-bar as far as the top of the carriage, and the needle in this case properly seizes the pattern-thread if it enters immediately above the carriage instead of just above the pattern-bars. There are therefore two points of insertion for the needles, the one when the carriages are in the middle position and the other when they pass the pattern-threads. These coincide if each carriage is tapered to a point at the top and ends at the crossing-point m. The carriages are guided in the combs—i. e., far from the point m. The carriages must move easily in the combs. They will consequently have some side shake. This is unimportant in the comb-slot; but at the points of the carriages the shaking becomes so great that the needles often enter incorrectly. To use the shortened carriages, as shown in Fig. 1, while raising the threads by means of a single set of needles is impracticable, since the needles would then require to be made so long that they would lose the necessary stiffness and would oscillate at their ends, so that it would be impossible for them to enter properly.

To enable shortened carriages to be used according to this invention, the operations that have previously been effected by one set of needles are effected by three sets of needles $n'$, $n^2$, and $n^3$. All the needles $n'$ and all the needles $n^2$ are each firmly connected to a longitudinal bar $M^{61}$ and $M^{71}$, respectively. All the needles belonging to one of these two sets therefore always make the same movements together. One arm of each of two two-armed levers, which are loosely mounted on stationary shafts, is connected to the bar $M^{61}$. The other arm of each of these levers carries at its end a roller which bears on a cam. By the rotation of the cams the levers are partially rotated, and consequently the bar is moved toward and away from the point m. Fig. 21 shows the mechanism for operating the bars $M^{61}$ and $M^{71}$. $M^{61}$, which has (to cause the needles $n'$ to lift the threads as stated in line 20 of page 26) a slight up-and-down movement in addition to its horizontal to-and-fro movement, is fixed at each end to a carrier 59, Fig. 21, which is connected to one arm of each of two levers 60 and 61, mounted loosely on stationary shafts $W^{18}$ and $W^{19}$, the connection to the lever 60 being direct and that to the lever 61 being through a link 62. The levers 60 and 61 are acted upon respectively by cams 63 and 64, fixed on the shaft $W^3$. $M^{71}$ is fixed at each end to a carriage 65, which is mounted to slide on a bar 66, secured to the comb $C^3$, and is connected by a link 67, a lever 68, mounted on a stud $W^{12}$, and a link 69 to a lever 70, which is loosely mounted on the shaft $W^6$ and is acted upon by a cam 71, fixed to the shaft $W^5$.

The needles $n^2$ are somewhat farther back when all the carriages are in the outer combs than is shown in Fig. 1. After the carriages have arrived in the middle position the needles $n^2$ are pushed forward and enter immediately above the carriages between their threads, Fig. 1. The needles $n^2$ are thin blades, which at their upper rear ends are embedded in cast tin. A thread located between two such needles will therefore when the needles $n^2$ are moved forward be made to project vertically upward to the point $m$. A longitudinal bar $M^{72}$ lies on and is fixed to the needles $n^2$, and a longitudinal bar $m^{82}$ lies on the longitudinal bar $M^{72}$ and is provided at its front edge with small teeth. The number of teeth per centimeter is equal to the number of comb-slots per centimeter. In accordance with the positions of the carriages in the comb-slots the threads of the carriages in the middle and back combs are held firmly in the spaces between the teeth of the bar $m^{82}$ and are consequently prevented from moving laterally. The threads of the carriages that move from the front comb into the middle comb and thence into the back comb enter as their carriages pass into the middle comb into the spaces (between the teeth of the bar $m^{82}$) that are over the comb-slots in which the transfers take place. After the carriages have entered the middle comb the back comb moves, and with it move the bar $M^{72}$, the needles $n^2$, and the bar $m^{82}$. The needles $n^2$ then move forward between the threads. Consequently the carriage-threads stand between the needles $n^2$ and in the spaces between the teeth of the bar $m^{82}$ in different vertical planes. These two sets of planes must coincide, however, in order that the needles $n^3$ may be able to enter correctly between these threads. The threads must therefore be brought out of the spaces between the teeth and be caused to enter those required by the position of the threads between the needles $n^2$. This is effected by the forward movement of the bar $M^{71}$ with the needles $n^2$ and the simultaneous backward movement of the bar $m^{82}$. The movement of the bar $m^{82}$ is effected by means of a cam and a lever connected with the bar $m^{82}$. Fig. 22 shows the means for operating the bar $m^{82}$. It is connected at each end to a link 72, attached to a lever 73, which is operated in opposition to the action of spring 74 by a cam 75, fixed on the shaft $W^3$. The forward movement of the bar $M^{72}$ and the needles $n^2$ is such that the threads come out of the spaces between the teeth with hardly any loss of tension. All the threads between the needles $n^2$ are thereby released from the teeth and are then by their tension moved laterally and placed between the needles $n^2$ exactly as required by their position. Then the bar $M^{71}$ and with it the needles $n^2$ and the bars $M^{72}$ and $m^{82}$ return to their original positions, while the threads between the needles enter the spaces between the teeth lying opposite to them and remain immovable in this position until they are again forced away by the bar $M^{72}$. At the moment when the threads of the carriages coming from the middle comb fall into a plane perpendicular to the combs and passing through the vertical line from the point $m$ the needles $n'$ enter between these threads. When in this position, these carriages stand with their lower ends immediately adjacent to and above the holes in the pattern-bars, and therefore raise the pattern-threads vertically, so that when the needles $n'$ are inserted these threads are also properly caught. After insertion the needles $n'$ lift the threads between which they have entered to the point $m$, and therefore bring them into the proper place. Before this has occurred the needles $n^2$ have already effected the exact adjustment of the threads of the carriages entering the back comb in the tooth-spaces of the bar $m^{82}$. Thereupon the needles $n^3$ enter immediately above the bar $m^{82}$ between the threads brought into the proper position and raise them to the height required by the pattern. The needles $n^3$ are each raised independently of the others of their group to any desired height at any desired intervals and are maintained at this height for any desired time. They are movable in a guide E vertically upward and downward and backward and forward. For this purpose the guide E comprises thin blades, which are placed parallel to one another and are embedded in cast-tin at the top and at the bottom and between which the needles $n^3$ can move in the manner hereinbefore described.

The needles $n'$ are drawn back after each insertion of the needles $n^3$ until they come clear of all the threads. This is not possible in the case of the needles $n^2$, between which the threads of the carriages in the back comb constantly pass. In order to prevent the lateral movements of this comb from having any influence on the tension of the threads in question, the bar $M^{71}$ is connected with the back comb, so that this bar and the needles $n^2$, connected therewith, are moved laterally with the back comb and to the same extent.

In order that the carriage-threads may remain equally tight whatever be the position of the carriages, they must go vertically upward from the point of rotation $m$. The threads of the carriages in the middle and back positions are compelled to do this by the bars $m^{82}$ and $M^{72}$; but this is not the case with those that move between the middle and front positions. The farther a carriage moves toward the front position the slacker would its threads become unless suitable means were provided to prevent this. For this purpose a longitudinal bar $M^{62}$ is arranged opposite to the bar $m^{82}$ in such a way that there remains free between the two bars only a very narrow slit through which the threads can pass upward.

The needles $n^3$ are controlled by two jacquards. One determines when the needles are to be withdrawn from the work and the second to what height they have to raise the carriage and the pattern-threads and then hold them.

Fig. 1 shows that to each needle $n^3$ there is connected a slide $B^4$. The slides $B^4$ have to withdraw from the fabric the needles that are held raised—*i. e.*, to move them backward—and then to bring them again between the threads—*i. e.*, to move them forward— after they have reached their lowest positions. In order to withdraw the needles, the slides $B^4$ must be raised. This is effected by lifting-bars $b^4$ in the manner hereinbefore described with reference to the slides $B'$, $B^2$, and $B^3$, the lifting-bars $b^4$ being mounted in combs $T^4$, carried by bearers $S^4$, secured to arms $H^4$, fixed to a shaft $D^4$. The shaft $D^4$ is operated at each end by the cam 53, Fig. 20, by means of a link $54^a$, connected to the lever 54. When a slide $B^4$ is raised, its projection $N^{43}$ comes into contact with an oscillatory longitudinal bar $M^{43}$, which is thereupon rotated backward, and thus moves also the raised slide backward, while a longitudinal bar $M^{42}$ prevents the slide from falling, since the projection $N^{41}$ of the slide $B^4$ bears on this bar. Each needle drawn out must be immediately reinserted. Consequently the slide $B^4$ after having been withdrawn must be at once again pushed forward. This is effected by the forward rotation of the bar $M^{43}$, which acts upon the projection $N^{42}$ of the backwardly-drawn slide. When the slide has returned to its original position, it falls and its projection $N^{41}$ comes between the two longitudinal bars $M^{41}$ and $M^{42}$, and is thereby held in this position until the next stroke effected by the jacquard. The bar $M^{44}$ prevents the needles $n^3$ from coming out of the guide E in consequence of their momentum and that of the slides connected thereto. The bars $M^{41}$ and $M^{42}$ are rigidly connected together, as shown in Fig. 1. These and the bar $M^{43}$ are worked by the following means: $M^{41}$ and $M^{42}$ are at each end secured to a carrier 76, Fig. 23, which is mounted loosely on a shaft $W^{15}$ and is fixed to an arm 77, connected by a link 78 to a lever 79, loosely mounted on the shaft $W^6$ and acted upon by a cam 80, fixed to the shaft $W^{10}$. At each end the bar $M^{43}$ is attached to an arm 81, Fig. 24, fixed to the shaft $W^{15}$, to which is also fixed an arm 82, which is connected by a link 83 to a lever 84, loosely mounted on the shaft $W^6$ and acted upon by a cam 85, fixed to the shaft $W^{10}$.

The lifting-needles $n^3$ are levers, each of which has two arms almost at right angles to each other and is pivoted near the junction of its two arms, while the outer end of one arm, which moves in the guide E, forms the needle-point and that of the other arm $H^5$ is rounded at $G^5$ and is connected to a slide $B^5$, which is in a horizontal position and can be slid therein. The connection between each needle and its slide is similar to that between the pushers and their slides. When these slides are moved backward, the needle-points are raised, whereas hitherto the needles have been raised by raising vertically-arranged bars vertically. Since considerably more power is required for raising a load than for sliding it, it follows that the power required to drive this machine is considerably reduced through this device for lifting the needles, because the weight of the bars, of which there have hitherto been two to each needle, is, comparatively speaking, very great.

Fig. 1 shows a slide $B^5$ in its extreme forward position. When it is drawn back, it presses on the rounded end of the needle lever-arm $H^5$, guided by it, so that this arm must rotate backward. The other arm of the lever, which contains the needle-point, is thereby raised.

All the needles $n^3$, inserted at the commencement of a stroke, are first raised to a definite and equal height, beneath which no holding thereof takes place. In order to cause the needles $n^3$ to enter with certainty between the threads, the lowest (first) position in which the needles hold fast twists must be about twenty-five millimeters above the crossing-point $m$. When, but not until, this position is attained, (which is called the "zero" position,) the needles can be each independently brought into any of twenty different positions. These positions are such that the distances apart of every two immediately succeeding positions are equal. The needles are brought into the zero position by a bar $M^{51}$, which on its backward rotation acts on the projections $N^{51}$ of the slides $B^5$, that are fully forward, until the needles $n^3$ in rotating upwardly have reached the zero position. Only above this are the lengths of the strokes determined by a jacquard.

To each slide there is connected a pawl $K^5$, which is provided with a projection having twenty steps. In front of these projections and immediately under the slides $B^5$ is a longitudinal bar $M^{52}$. When the bar $M^{52}$ is pushed backward and the pawls $K^5$ have not been raised to clear it completely, it presses against the pawls and moves them backward. The slides $B^5$, connected to the pawls, are thus moved backward, and consequently cause the needle lever-arms $H^5$, connected therewith, to be rotated backward and the points of the corresponding needles $n^3$ to be raised. The path of the bar $M^{52}$ is always the same; but this is not the case with the slides $B^5$, moved by the bar $M^{52}$. Their paths are determined by the steps of the pawls $K^5$, against which the bar $M^{52}$ bears. These steps are such that a needle $n^3$ is raised one needle position above its zero position when the bar $M^{52}$ bears against the lowest step of its pawl $K^5$, that when it bears on the next succeeding higher one the needle $n^3$ is raised to the second needle position counted from the zero position, and so on, the needle being raised one needle position higher for every step.

The pawls $K^5$ are connected with a dropper-jacquard and are raised thereby as desired in such a way that the step corresponding to the required lift of the needle is always stopped in front of the bar $M^{52}$. By providing steps it is therefore rendered possible to raise the needles to the required height by a single operation instead of by a double operation of the jacquard as hitherto. Consequently when such pawls are used the number of jacquard-cards required is reduced by one-half.

The bar $M^{52}$ has completed its backward stroke when it has moved sufficiently far to enable it to raise the lifting-needles by twenty needle positions, whereupon it returns to its original position.

The slides $B^5$ are provided near their rear ends with teeth, which engage with a longitudinal bar $M^{53}$, whereby they are prevented from moving forward with the bar $M^{52}$. This must not occur while their respective lifting-needles have to be kept raised. The teeth of the slides $B^5$ are disengaged from the bar $M^{53}$ only when the slides $B^5$ are raised.

The slides $B^5$ must be raised and disengaged from the bar $M^{53}$ whenever a needle has to be withdrawn from the work. Such lifting can be effected only by a jacquard. To withdraw a needle $n^3$, in addition to the raising of the slide $B^5$ by means of the jacquard, the corresponding slide $B^4$ must be lifted. Consequently one jacquard can be dispensed with by causing the slide $B^4$ to act on the slide $B^5$. For this purpose there is mounted on each slide $B^4$ a thin vertical bar $m^5$. Each slide $B^5$ bears against the upper end of the corresponding bar $m^5$, which has riveted to it two extensions that engage the bar $B^5$ on opposite sides to hold it in place. When the slide $B^4$ is raised in order to withdraw a needle, the bar $m^5$, connected therewith, is also raised, and with it the slide $B^5$, resting thereon, which consequently moves out of engagement with the bar $M^{53}$, and is thus no longer prevented from moving forward. The slide $B^5$ is then moved forward by the bar $M^{54}$, which moves forward each time the slides $B^5$ are raised and presses against the rear ends of the raised slides $B^5$ until the latter are moved fully forward.

Above the slides $B^5$ there are also in the longitudinal direction of the machine lifting-bars $b^5$, which are moved by a dropper-jacquard. These lifting-bars have small holes punched through the projections $h$, which are on the under side of these bars, as is shown in Fig. 3. In each of these holes there is secured the end of a cord $s^5$, which passes over pulleys on a guide-bar and then down to one of the pawls $K^5$, to which it is attached. When one of the lifting-bars $b^5$ is moved by the jacquard, the cords connected therewith are pulled, and the pawls connected to these cords are thereby rotated upwardly to an extent corresponding to the width of the droppers operating in the dropper-jacquard, whereby the required step of the pawl is placed so as to be struck by the bar $M^{52}$. At the moment when the bar $M^{52}$ has completed its backward movement the jacquard releases the pawls, which then move quickly downward into their original positions during the forward movement of the bar $M^{52}$, and can therefore be raised again in time before the succeeding backward movement of the bar $M^{52}$. To prevent any pawl from falling too late, there is arranged over them a longitudinal bar $M^{55}$, which presses at the proper moment on the pawls. In the case of a repetition after ninety-six needles there are required ninety-six lifting-bars $b^5$, and therefore for a sixteen-point machine for a width of goods of three hundred and sixty centimeters two thousand three hundred and four pawls are raised by means of ninety-six lifting-bars.

The bars $M^{51}$, $M^{52}$, $M^{54}$, and $M^{55}$ are operated as follows: The mechanism for $M^{51}$ is shown in dotted lines in Fig. 24. $M^{51}$ is carried by a lever 86, which is mounted loosely on the shaft $W^{21}$ and is connected by a link 87 to a lever 88, loosely mounted on the shaft $W^6$ and acted upon by a cam 89. $M^{52}$ is at each end secured to a carriage 90, Fig. 25, mounted to slide on a fixed bar 91 and connected by a link 92 to a compound lever 93, which is loosely mounted on the shaft $D^4$ and is acted upon by cams 94 and $94^a$. $M^{54}$ is carried at each end by a lever 95, Fig. 24, mounted loosely on the shaft $W^{21}$ and connected by a link 96 to a lever 97, loosely mounted on the shaft $W^6$ and acted upon by a cam 98. $M^{55}$ is carried by a bar 99, attached to a lever 100, loosely mounted on the shaft $W^6$ and acted upon by a cam 101, the movement of the bar 99 being controlled by an arm 102, loosely mounted on the shaft $D^4$ and having a pin-and-slot connection with the bar 99.

In order to prevent any shocks through the falling of the slides and the pawls on hard surfaces, there are arranged under them shafts $w'$, $w^{21}$, $w^{22}$, $w^3$, and $w^4$, covered with india-rubber, upon which the slides and the pawls fall.

The slides $B'$ are provided with guides $F^{11}$, $F^{12}$, and $F^{13}$. The slides $B^2$ are provided with guides $F^{21}$ and $F^{23}$. The slides $B^3$ are provided with guides $F^{31}$ and $F^{32}$. The slides $B^4$ are provided with guides $F^{41}$, $F^{42}$, and $F^{43}$, and the slides $B^5$ are provided with guides $F^{51}$, $F^{52}$, $F^{53}$, and $F^{54}$.

Fig. 26 is a partial front elevation showing driving mechanism at the end of the machine shown in side elevation in Fig. 8 and also a dropper-jacquard for operating the pattern-thread bars B, the connection thereto being marked B.

Figs. 27 and 28 are diagrams illustrating the arrangement of the jacquards employed and the method of driving the same. The pattern-thread bars B are connected to a dropper-jacquard 103, driven by the shaft $W^3$ through bevel-gear 104. The lifting-bars $b'$ are operated through connections $b^{100}$ by a bottom-bar jacquard 105, driven from the shaft $W^3$ through bevel-gear 106. The lifting-bars $b^{21}$ and $b^{22}$ are operated, respectively, through connections $b^{201}$ and $b^{202}$ by bottom-bar jacquards 107 and 108, driven from the shaft $W^3$ by bevel-gear 109 and 110. The jacquards 103, 105, 107, and 108 are all at the right-hand end of the machine. The lifting-bars $b^3$ and $b^4$ are respectively operated through connections $b^{300}$ and $b^{400}$ by bottom-bar jacquards 111 and 112, driven through bevel-gear 113 and 114 by a shaft $W^{13}$, connected by bevel-gear and an inclined shaft $W^{17}$ to the shaft $W^4$, Fig. 8. A dropper-jacquard 115, driven by bevel-gear 116 from the shaft $W^{13}$, operates through connections $b^{500}$ the lifting-bars $b^5$.

Having thus described my invention, what I claim as new therein, and desire to secure by Letters Patent, is—

1. In a lace-loom, the combination of sets of pushers and needles, slides connected thereto, pawls connected to some of the sets of slides, sets of lifting-bars each of which is provided with a series of projections adapted to come into contact with and lift the slides and pawls corresponding thereto, and a jacquard to which each lifting-bar is connected to be moved laterally thereby, and means for raising and lowering the said lifting-bars.

2. In a lace-loom, the combination of three groups of needles one of them jacquard-controlled vertically, of which two groups adjust the threads for the correct insertion of the jacquard-controlled group of needles, which raises the twists and threads to the various heights required by the pattern.

3. In a lace-loom, a set of needles simultaneously movable at one side of the lace, a set of needles simultaneously rotatable between threads on the other side of the lace and needles jacquard-controlled vertically above the latter to lift the lace, substantially as described.

4. In a lace-loom, a set of lace-lifting needles having two arms at an angle to one another, a jacquard-controlled slide to reciprocate one of said arms, a reciprocable slide connected to the other arm, a jacquard-controlled stepped pawl pivoted to said slide and a bar contacting therewith, whereby the extent of movement of said bar and the vertical movement of the needle are selectively determined, substantially as described.

5. In a lace-loom, three combs arranged in the same arc of a circle, two of said combs laterally movable, thread-carriages, jacquard-controlled means for moving the carriages from one comb into another and for holding the carriages in the comb, a set of needles simultaneously movable, a set of needles to separate and position the carriage-threads and a serrated reciprocable bar to hold the carriage-threads in alinement, and a set of jacquard-controlled independently-movable needles to lift and hold the lace, substantially as described.

6. In a lace-loom, a central stationary, and a front and a back comb laterally movable and on the same arc of a circle, thread-carriages, jacquard-controlled means to move in the carriages from one comb to another, a set of needles movable into the lace from the front, a set of rotatable needles arranged to take between the carriage-threads to aline them and laterally movable with the back comb, a serrated reciprocable bar on the last set of needles to hold the carriage-threads in alinement, a set of needles each needle independently operated and jacquard-controlled means for lifting the needles, and jacquard-controlled means to selectively move them into and out of the lace, substantially as described.

7. In a lace-making machine, a stationary comb, laterally-movable front and back combs in the same arc of a circle, carriages therein and jacquard-controlled shifting means in each comb-slot of each comb to move the carriages, the shifting means in the slots of the stationary comb timed to move twice to one movement of the means in either of the other comb-slots, needles, jacquard-controlled means longitudinally reciprocable to raise and lower the needles and jacquard-controlled means longitudinally movable to withdraw the needles from and insert them into the lace, substantially as described.

8. In a lace-making machine, needles for supporting the lace comprising two arms at an angle to each other, a jacquard-controlled longitudinal slide connected to one arm of each needle to raise and lower it, a jacquard-controlled slide connected to each needle to withdraw it from and insert it into the lace, substantially as described.

9. In a lace-making machine, needles for supporting the lace comprising two arms at an angle to each other, a jacquard-controlled longitudinal slide to raise and lower each needle, a jacquard-controlled longitudinal slide connected to each needle to withdraw it from and insert it into the lace and means connecting the slides of each needle, whereby the former can be reciprocated simultaneously with the latter, substantially as described.

10. In a lace-making machine, needles for supporting the lace, each comprising a bell-crank lever, one arm of each needle rotatably secured to a longitudinally-reciprocable jacquard-controlled slide, means for locking the slide in several positions, a slide to which each needle is rotatably secured near the bell-crank angle, said slide jacquard-controlled to withdraw the needle from and insert into the lace, means connecting the two slides of each needle, whereby the first slide will be moved simultaneously with the second and at the same time unlocked preparatory to being lifted, substantially as described.

11. In a lace-making machine, needles for supporting the lace, each comprising a bell-crank lever, an upper slide having a serrated edge, one arm of each needle rotatably connected to one of said slides, a jacquard-controlled pawl having a stepped tail connected to each slide, a longitudinal reciprocable bar common to all the pawls to move them back to raise the needles, a stationary bar to engage the serrated edges of the slides to lock them, a lower jacquard-controlled slide secured to each needle near the angle of the bell-crank lever, a rod to connect the lower and upper slides of each needle, whereby when the lower slide is operated the upper slide is unlocked and both moved simultaneously, and means common to all the pawls to cause them to be positively moved down preparatory to withdrawing the needles, substantially as described.

12. In a lace-making machine, needles for supporting the lace, each comprising a bell-crank lever, an upper slide having a serrated edge, one arm of each needle connected to one of said slides, pawls having stepped tails connected to the slides, bars transverse to said pawls and a dropper-bar jacquard to selectively position the bars to move the pawls, a rail common to all the pawls to move them, a locking-rail common to all the upper slides to engage the serrated edges, a lower slide having a projection and connected to each bell-crank near its angle, a group of transverse slides, each slide having a projection, a bottom-bar jacquard to selectively position the transverse slides to cause their projections to aline with those on the lower slides, lifting-bars to move the transverse slides toward the lower slides, and a vertical rod to transmit the lift of the lower to the upper slide, substantially as described.

13. In a lace-loom, the combination with a stationary comb, a laterally-movable front and back comb, and carriages movable from one comb to another, with a rod and pushers for the stationary comb detachably mounted thereon, a front rod laterally movable with the front comb, pushers for the front comb detachably mounted thereon, a back rod and pushers for the back comb detachably mounted thereon, jacquard-controlled means for lifting the slides of the pushers of the front and back combs, and two pawls connected to each slide of the pushers of the middle comb, bars to longitudinally move the slides and pawls, and jacquard-controlled devices to move each pawl and slide into the path of its actuating-bar, substantially as described.

14. In a lace-loom, a laterally-movable comb adapted to receive thread-carriages, a second comb below it movable therewith and having perforated slotted teeth, a rod having a flat side adapted to pass through the slots in said teeth into the perforations and when partially rotated be held therein, pushers one for each comb-slot coöperating with the first comb, detachably mounted on said rod and in the slots of the second comb, a slide having an upper and lower projection and detachably connected to each pusher, a bar common to all the slides movable below them, jacquard-controlled mechanism to selectively lift the slides, said slides being held lifted by said bar moving under their lower projections, two reciprocable bars connected together one on each side of the upper projections of the slides and arranged to engage them when lifted, substantially as described.

15. In a lace-loom, a comb adapted to receive thread-carriages, a second comb below it having perforated slotted teeth, a rod having a flat side adapted to pass through the slots into the perforations and be held therein when partially rotated, pushers coöperating with the first comb, a pusher in each comb-slot, said pushers detachably connected to said rod in a corresponding comb-slot of the second comb, a slide detachably connected to each pusher, two pawls each having two upper and a lower projection connected to each slide, jacquard-controlled mechanism to lift the pawls, a bar movable under each of the lower projections of said pawls when lifted, two connected reciprocable bars to engage the upper projections of the lifted pawls to selectively reciprocate the slide, substantially as described.

16. In a machine for the manufacture of pillow-lace, the combination of three combs which are arranged on the same arc of a circle and of which the two outer ones (the front and back combs) are movable laterally, pushers and a toothed driving-rod for moving carriages in slots of the said combs, a set of needles for lifting the twists, a back set and a front set of needles for separating threads to facilitate the insertion of the first-mentioned set of needles, slides connected to the said pushers and to the needles for lifting the twists (there being one set of slides for raising and lowering the twist-lifting needles and another set of slides for inserting and withdrawing the same), pawls (of which there are two for each slide) pivotally mounted on the slides for pushers of the middle comb, bottom-bar jacquards, thin longitudinal or lifting bars connected with the slides of the bottom-bar jacquards and adapted to operate the first-mentioned slides—through the said pawls in the case of the slides of the pushers of the middle comb—means for moving the first-mentioned slides longitudinally when operated by the said longitudinal or lifting bars, and a toothed bar for separating threads and adapted to prevent a lateral movement of the threads of the carriages in the back comb after the insertion of the separating-needles, substantially as described.

17. In a machine for the manufacture of pillow-lace, the combination of three combs which are arranged on the same arc of a circle and of which the two outer ones (the front and back combs) are movable laterally, pushers and a toothed driving-rod for moving carriages in slots of the said combs, a set of needles for lifting the twists, a back set and a front set of needles for separating threads to facilitate the insertion of the first-mentioned set of needles, slides connected to the said pushers and to the needles for lifting the twists (there being one set of slides for raising and lowering the twist-lifting needles, and another set of slides for inserting and withdrawing the same), pawls (of which there are two for each slide) pivotally mounted on the slides for pushers of the middle comb, thin longitudinal or lifting bars connected with the slides of bottom-bar jacquards and adapted to separate the first-mentioned slides—through the said pawls in the case of the slides of the pushers of the middle comb—means for moving the first-mentioned slides longitudinally when operated by the said longitudinal or lifting bars, and a toothed bar for separating threads and adapted to prevent a lateral movement of the threads of the carriages in the back comb after the insertion of the separating-needles, the blades of each comb being embedded at each of their ends in cast metal so as to render them immovable in relation to one another, substantially as described.

18. In a machine for the manufacture of pillow-lace, the combination of three combs, which are arranged on the same arc of a circle and of which the two outer ones (the front and back combs) are movable laterally, pushers and a toothed driving-rod for moving carriages in slots of the said combs, a set of needles for lifting the twists, a back set and a front set of needles for separating threads to facilitate the insertion of the first-mentioned set of needles, slides connected to the said pushers and to the needles for lifting the twists (there being one set of slides for raising and lowering the twist-lifting needles and another set of slides for inserting and withdrawing the same), pawls (of which there are two for each slide) pivotally mounted on the slides for pushers of the middle comb, thin longitudinal or lifting bars connected with the slides of the bottom-bar jacquards and adapted to operate the first-mentioned slides through the said pawls in the case of the slides of the pushers of the middle comb—means for moving the first-mentioned slides longitudinally when operated by the said longitudinal or lifting bars—and a toothed bar for separating threads and adapted to prevent a lateral movement of the threads of the carriages in the back comb after the insertion of the separating-needles, the pushers and the twist-lifting needles being connected with their slides by means of rounded end portions located in slots formed by the slides for the purpose of enabling the pushers and the twist-lifting needles to be easily removed singly, substantially as described.

19. In a machine for the manufacture of pillow-lace, the combination of three combs, which are arranged on the same arc of a circle and of which the two outer ones (the front and back combs) are movable laterally, pushers and a toothed driving-rod for moving carriages in slots of the said combs, a set of needles for lifting the twists, a back and a front set of needles for separating threads to facilitate the insertion of the first-mentioned needles, slides connected to the said pushers and to the needles for lifting the twists (there being one set of slides for raising and lowering the twist-lifting needles and another set of slides for inserting and withdrawing the same), pawls (of which there are two for each slide) pivotally mounted on the slides for pushers of the middle comb, bottom-bar jacquards, thin longitudinal or lifting bars connected with the slides of bottom-bar jacquards and adapted to operate the first-mentioned slides—through the said pawls in the case of the slides of the pushers of the middle comb—means for moving the first-mentioned slides longitudinally when operated by the said longitudinal or lifting bars, a toothed bar for separating threads and adapted to prevent a lateral movement of the threads of the carriages in the back comb after the insertion of the separating-needles, pawls which are mounted on the said slides for raising the twist-lifting needles and are provided with stepped projections, and means for moving the slides last mentioned longitudinally by acting upon the steps of the said projections, for the purpose of enabling each of the twist-lifting needles to be raised by a single operation of a jacquard to any one of several different positions and held therein by means of a single jacquard-slide.

Signed at 13 Low Pavement, Nottingham, England, this 19th day of October, 1901.

AUGUST MATITSCH.

Witnesses:
DOUGLAS E. STORER,
THOS. H. COOK.